US009124761B2

(12) United States Patent
Wada et al.

(10) Patent No.: US 9,124,761 B2
(45) Date of Patent: Sep. 1, 2015

(54) TELEVISION COMMUNICATION SYSTEM, TERMINAL, AND METHOD

(75) Inventors: Jyouji Wada, Kanagawa (JP); Mikio Morioka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

(21) Appl. No.: 13/603,917

(22) Filed: Sep. 5, 2012

(65) Prior Publication Data

US 2013/0057641 A1  Mar. 7, 2013

(30) Foreign Application Priority Data

Sep. 5, 2011  (JP) ................................. 2011-192661

(51) Int. Cl.
*H04N 7/15* (2006.01)
*G06K 9/00* (2006.01)
*H04L 12/18* (2006.01)

(52) U.S. Cl.
CPC .............. *H04N 7/15* (2013.01); *G06K 9/00375* (2013.01); *H04L 12/1827* (2013.01); *H04L 12/1822* (2013.01)

(58) Field of Classification Search
USPC ................ 348/14.07, 744, E07.083, E09.025
See application file for complete search history.

(56) References Cited

U.S. PATENT DOCUMENTS

| | | | |
|---|---|---|---|
| 6,385,331 B2 | 5/2002 | Harakawa et al. | |
| 2001/0043719 A1 | 11/2001 | Harakawa et al. | |
| 2001/0045940 A1 | 11/2001 | Hansen | |
| 2006/0126854 A1* | 6/2006 | Noto | 381/19 |
| 2008/0133640 A1 | 6/2008 | Saito et al. | |
| 2009/0136131 A1 | 5/2009 | Coldefy et al. | |
| 2009/0144392 A1* | 6/2009 | Wang et al. | 709/217 |
| 2010/0141897 A1 | 6/2010 | Kawano et al. | |
| 2011/0001701 A1 | 1/2011 | Nakano | |
| 2011/0063404 A1* | 3/2011 | Raffle et al. | 348/14.08 |
| 2011/0208807 A1* | 8/2011 | Shaffer | 709/203 |
| 2012/0026189 A1* | 2/2012 | Yokoyama et al. | 345/619 |
| 2012/0127074 A1 | 5/2012 | Nakamura et al. | |
| 2012/0206558 A1* | 8/2012 | Setton | 348/14.03 |

FOREIGN PATENT DOCUMENTS

| | | |
|---|---|---|
| EP | 0866419 | 9/1998 |
| JP | 06-308879 | 11/1994 |

(Continued)

OTHER PUBLICATIONS

International Search report, mail date is Apr. 3, 2013.

(Continued)

*Primary Examiner* — Joseph J Nguyen
(74) *Attorney, Agent, or Firm* — Greenblum & Bernstein, P.L.C.

(57) ABSTRACT

When a material sharing mode using a projector at a first point and the projector at a second point is active, the projector at the first point causes a projection unit to project a video image from a first personal computer onto a projection screen, causes an image taking unit to take an image of the projected video image on the projection screen, causes a control unit of the projector or the first personal computer to compare the taken video image with a supply video image supplied from the first personal computer to the projector, and supplies a difference video image generated based on the comparison to the projector at the second point so as to be superimposed on the supply video image.

16 Claims, 23 Drawing Sheets

(56) References Cited

FOREIGN PATENT DOCUMENTS

| | | |
|---|---|---|
| JP | 08-181960 | 7/1996 |
| JP | 09-162996 | 6/1997 |
| JP | 2003-504705 | 2/2003 |
| JP | 2005-117285 | 4/2005 |
| JP | 2007-214803 | 8/2007 |
| JP | 2009-071478 | 4/2009 |
| JP | 2009-181019 | 8/2009 |
| JP | 2010-154361 | 7/2010 |
| WO | 2008/043182 | 4/2008 |

OTHER PUBLICATIONS

Japan Office action in Japan Patent Application No. 2012-193806, mail date is Mar. 10, 2015.

* cited by examiner

Camera is directed to participants

Camera is directed to projection screen

Fig.22
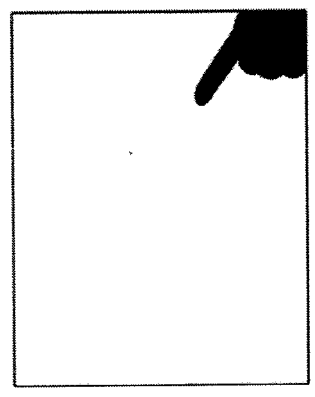
(a) Example of detected difference area
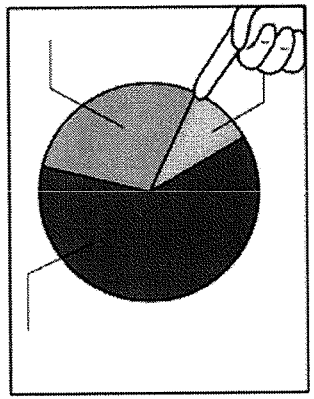
(b) Example in which whole deference area is replaced with projected image
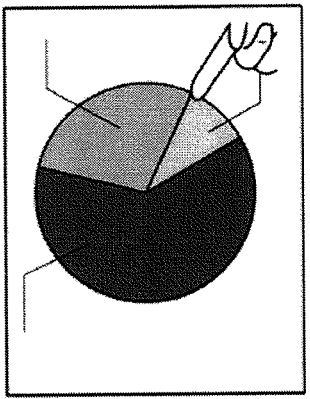
(c) Example in which part of difference area is replaced with projected image

TELEVISION COMMUNICATION SYSTEM, TERMINAL, AND METHOD

BACKGROUND OF THE INVENTION

1. Field of the Invention

The present invention relates to a television communication system, terminal, and method.

2. Background of the Invention

Television communication systems are utilized for television conference, etc., and in the related art, a general structure of television communication systems is as follows.

Such a television communication system includes a first projector located at a first point, a first personal computer connected to the first projector, and a second projector that is connected to the first personal computer communicatively and located at a second point.

In addition, when a material sharing mode using the first projector and the second projector is active, the first projector causes a first projection unit to project a video image from the first personal computer onto a first projection screen and causes a first image taking unit to take an image of the projected video image on the first projection screen to detect a pointer image cast in the first projector (for example, Patent literature 1).

Japanese Patent Laid-Open No. 2009-181019 discloses such a related art.

In the related art, while the material sharing mode is active, in a state in which a pointer image is cast using a laser pointer, etc., toward the projected image on the first projection screen from the first projector at the first point while a presentation is being made, the first projector causes the first image taking unit to take an image of the projected video image of the first projection screen to detect the position of the pointer image cast in the first projector.

In addition, the pointer image is superimposed on the projected image from the second projector onto a second projection screen by supplying the position of the pointer image to the second projector at the second point.

Therefore, members at the second point can also perceive the position of the pointer pointed on the first projection screen at the first point, so that the conference can proceed smoothly.

However, in the related art, the conference may not always necessarily proceed smoothly because the members at the second point can perceive the pointed location in the projected image on the first projection screen only when the pointer image is displayed at the first point.

For example, the pointer image must be displayed even in a case where the intention can otherwise be conveyed more properly, such as by pointing the projected image by a finger or by superimposing another shaped object to express a location of interest or to convey what should be pointed. In this case, the conference, or communication, may not necessarily proceed smoothly.

SUMMARY OF THE INVENTION

The object of the present invention is to cause the communication to proceed smoothly.

In order to achieve the object of the present invention, a television communication terminal according to the present invention includes: a reception unit that receives a video image from other site, a mode selection unit that switches a mode between a conference mode and a material sharing mode, a material data input unit where material data used in the material sharing mode is input, an image taking unit that takes an image of a participant in the conference mode, a projection unit that projects the video image received from the other site through the reception unit onto the projection screen in the conference mode and projects the material data input from the material data input unit onto the projection screen in the material sharing mode, and a transmission unit that transmits the video image taken by the image taking unit to the other site in the conference mode and transmits the material data to the other site in the material sharing mode, through the communication unit. In the television communication terminal, the image taking unit takes an image of the projection screen projected by the projection unit in the material sharing mode and includes a superimposition detection unit that detects superimposition from the projection screen of the projection unit, the image of which has been taken by the image taking unit in the material sharing mode, and the transmission unit transmits the detection result of the superimposition detection unit to the other site.

According to the present invention, for example, in a case where the intention can be conveyed more properly, such as by pointing the material data projected onto the projection screen by a finger or by superimposing another shaped object to express a location of interest or to convey what should be pointed, the points of interest can be shared with the other site, thereby causing the communication to proceed smoothly.

BRIEF DESCRIPTION OF THE DRAWINGS

FIG. 22 is a diagram illustrating an example of image composition in the television conference terminal according to the second embodiment.

DETAILED DESCRIPTION OF THE PREFERRED EMBODIMENTS

A television communication system according to embodiments of the present invention will be described below with reference to accompanying drawings.

First Embodiment

Figure 1:
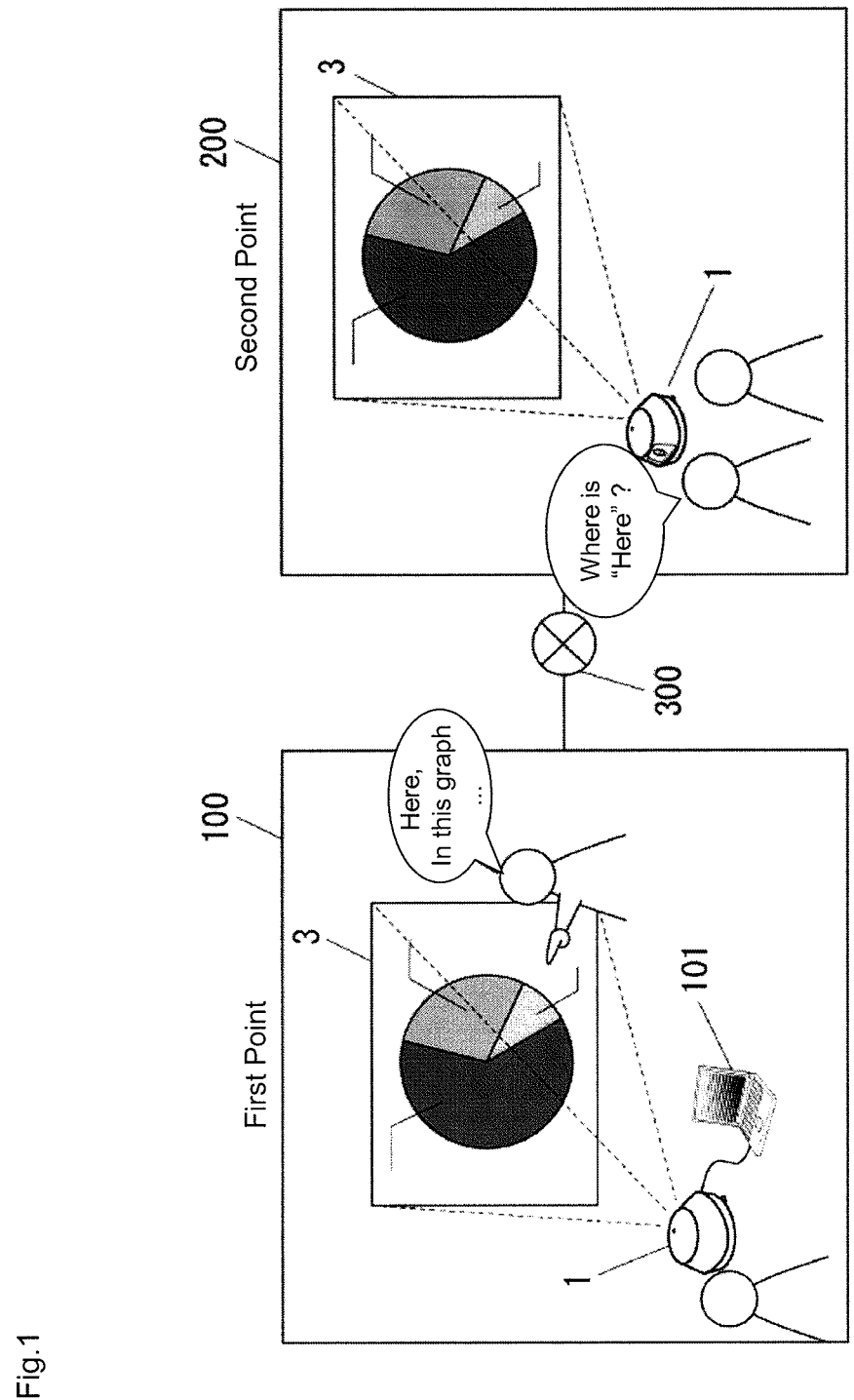
FIG. 1 is a diagram illustrating a television communication system according to a first embodiment of the present invention.

FIG. 1 illustrates a state in which television conference is performed between a first point 100 and a second point 200.

For example, in the first point 100, a projector 1, a first personal computer 101 connected to the projector 1, and a projection screen 3 are arranged.

In addition, in the second point 200, the projector 1 and the projection screen 3 are arranged.

In addition, the first personal computer 101 at the first point 100 is in a state of being connected to the projector 1 at the second point 200 through an optical cable 300.

In addition, the projector 1 at the first point 100 and the projector 1 at the second point 200 are connected to each other through the optical cable 300.

Figure 5:
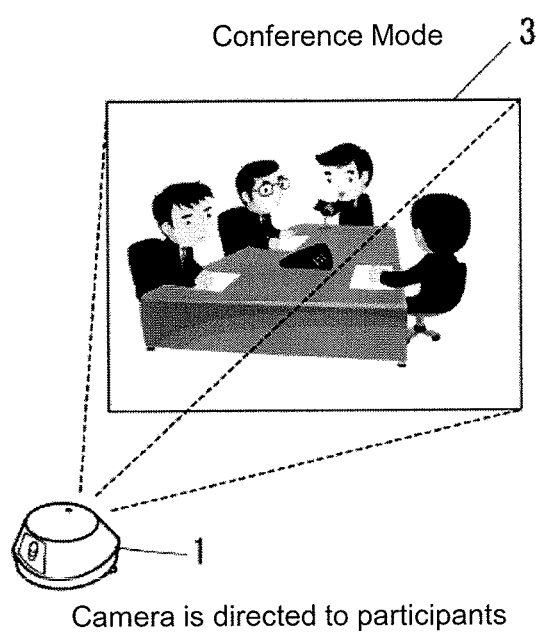
FIG. 5 is a diagram illustrating the operation of the television communication system according to the first embodiment.
Figure 6:
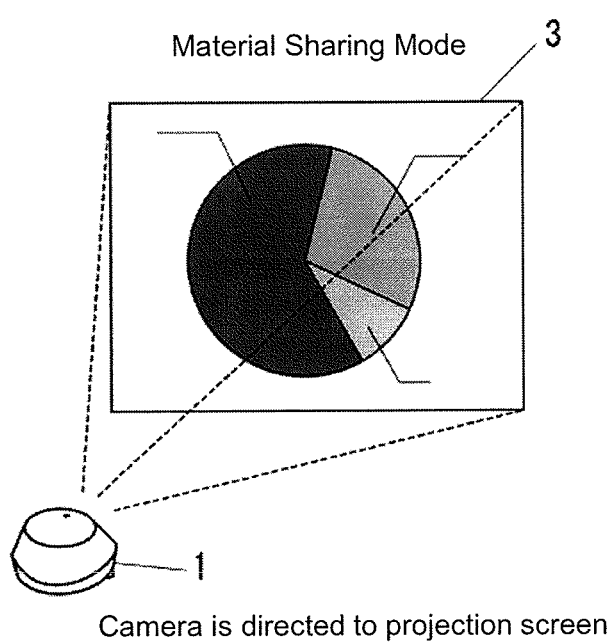
FIG. 6 is a diagram illustrating the operation of the television communication system according to the first embodiment.

In the television conference, there are a conference mode illustrated in FIG. 5 and a material sharing mode illustrated in FIG. 6.

Figure 9:
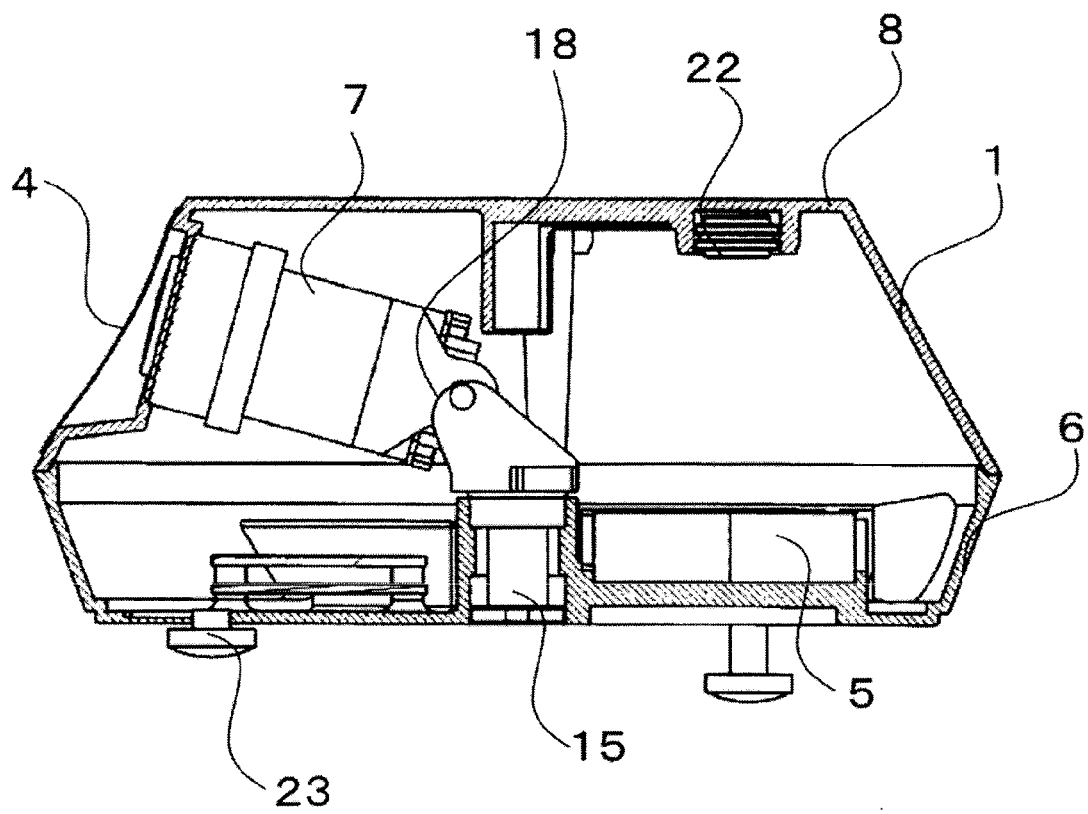
FIG. 9 is a cross-sectional view of the projector according to the first embodiment.
Figure 10:
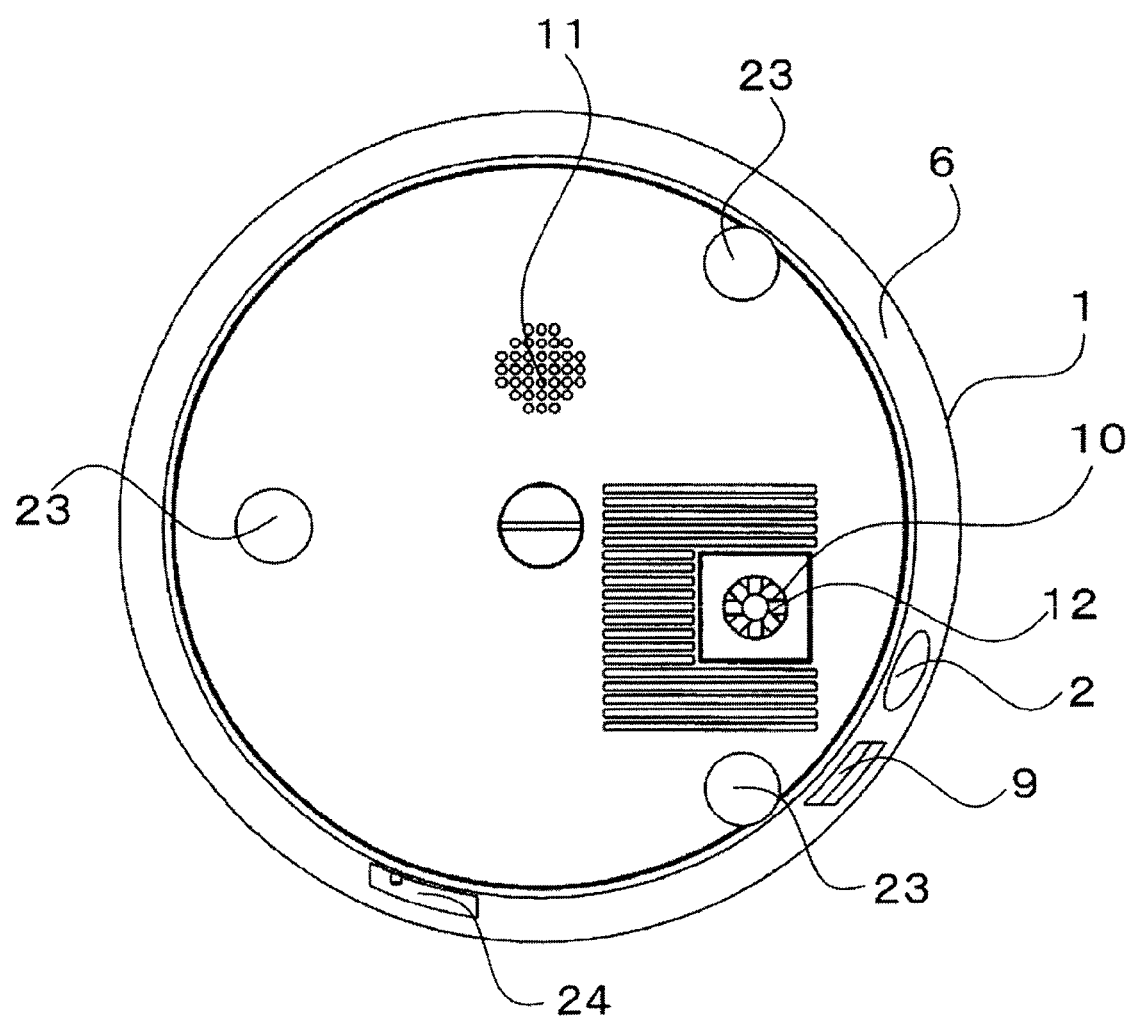
FIG. 10 is a diagram of the bottom surface of the projector according to the first embodiment.

In the conference mode illustrated in FIG. 5, the faces of members who are gathered at the first point 100 are taken by an image taking unit (7 in FIG. 9) through an image taking port (4 in FIG. 9) of the projector 1 at the first point 100, and the faces are projected from a projection unit (5 in FIG. 9) of the projector 1 at the second point 200 onto the projection screen 3 at the second point 200 through a projection port (2 in FIG. 10).

On the contrary, the faces of members who are gathered at the second point 200 are taken by an image taking unit (7 in FIG. 9) through an image taking port (4 in FIG. 9) of the projector 1 at the second point 200, and the faces are projected from the projection unit (5 in FIG. 9) of the projector 1 at the first point 100 onto the projection screen 3 of the first point 100 through the projection port (2 in FIG. 10).

That is, in the conference mode, the conference proceeds while the members who are gathered at the first point 100 and the members who are gathered at the second point 200 look at the faces each other.

Next, in the material sharing mode illustrated in FIG. 6, in the first embodiment, as illustrated in FIG. 1, information held in the first personal computer 101 at the first point 100 is projected from the projection units (5 in FIG. 9) of the projectors 1 at the first point 100 and the second point 200 onto the projection screens 3, respectively.

That is, in the material sharing mode, the conference proceeds while information held in the first personal computer 101 is shared among the members who are gathered at the first point 100 and the members who are gathered at the second point 200.

Next, the structure of the projector 1 will be described with reference to FIGS. 7 to 18.

Figure 7:
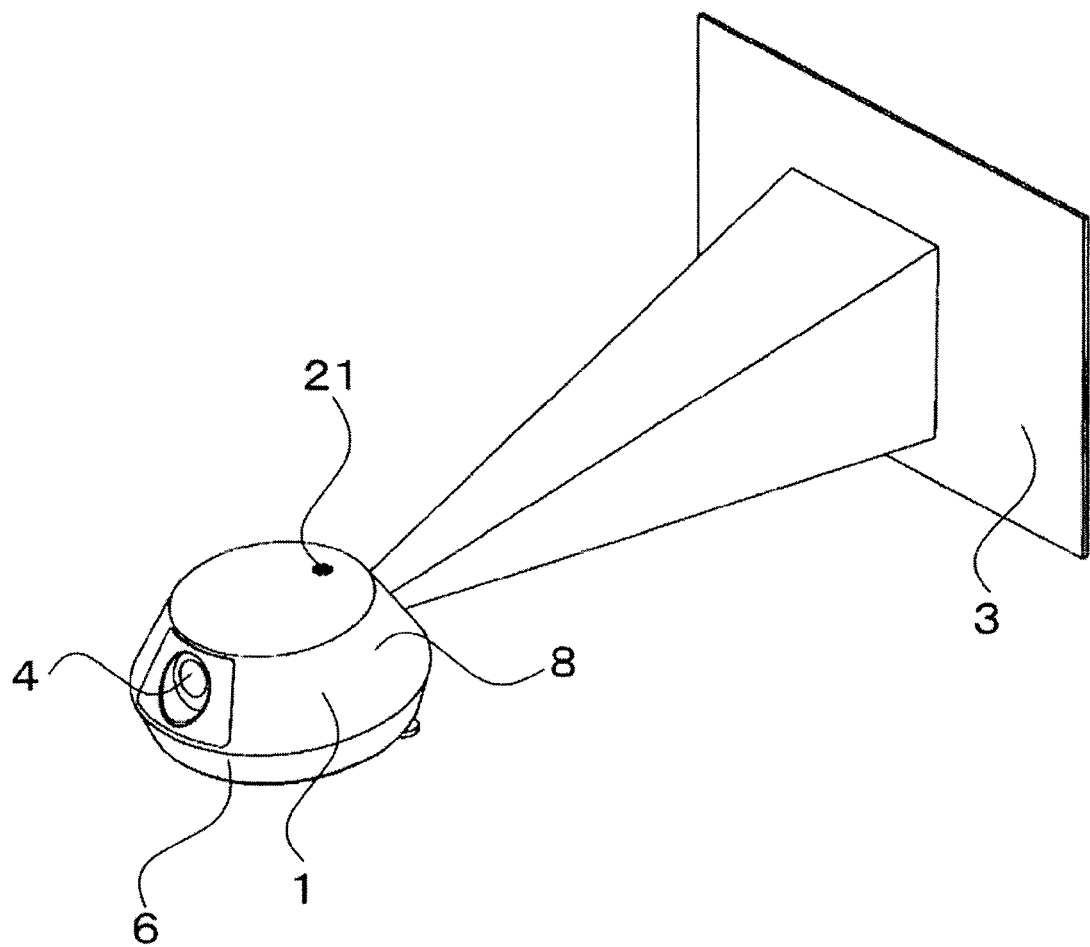
FIG. 7 is a perspective view from below of a projector according to the first embodiment.
Figure 8:
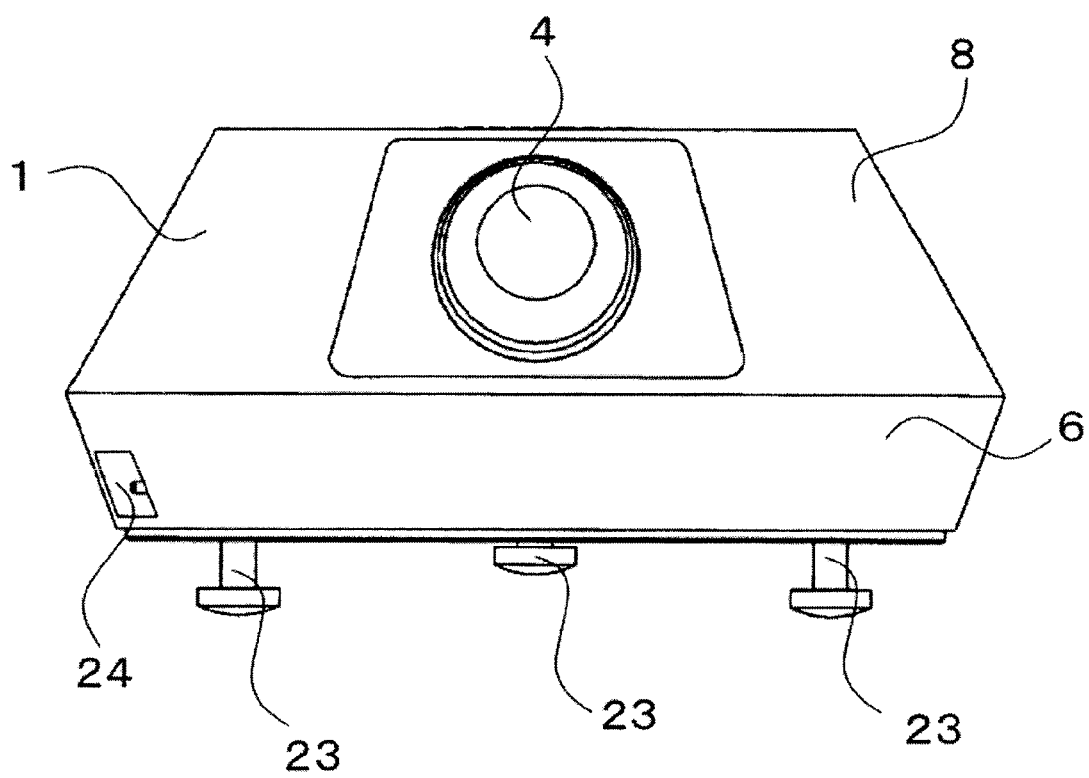
FIG. 8 is a front view of the projector according to the first embodiment.

As will be seen from FIGS. 7 to 9, the projector 1 is constituted by a lower case 6 that houses the projection unit 5, and an upper case 8 that is rotatably arranged on the lower case 6 in the horizontal direction and houses the image taking unit 7.

The lower case 6 has a cylindrical shape in which the top surface opens, and the upper case 8 has a cylindrical shape in which the bottom surface opens.

In addition, the lower case 6 has the cylindrical shape of which the diameter of the upper part is more enlarged than that of lower part in the outer circumferential surface, the projection port 2 is provided on the outer circumferential surface of the lower case 6 having such a shape as illustrated in FIG. 10, and the projection unit 5 is connected to the projection port 2, as illustrated in FIG. 9.

In addition, as illustrated in FIGS. 7 to 9, the upper case 8 has the cylindrical shape of which the diameter of the lower part is more enlarged than that of upper part in the outer circumferential surface, the image taking port 4 is provided on the outer circumferential surface of the upper case 8 having such a shape, and the image taking unit 7 is connected to the image taking port 4.

Figure 11:
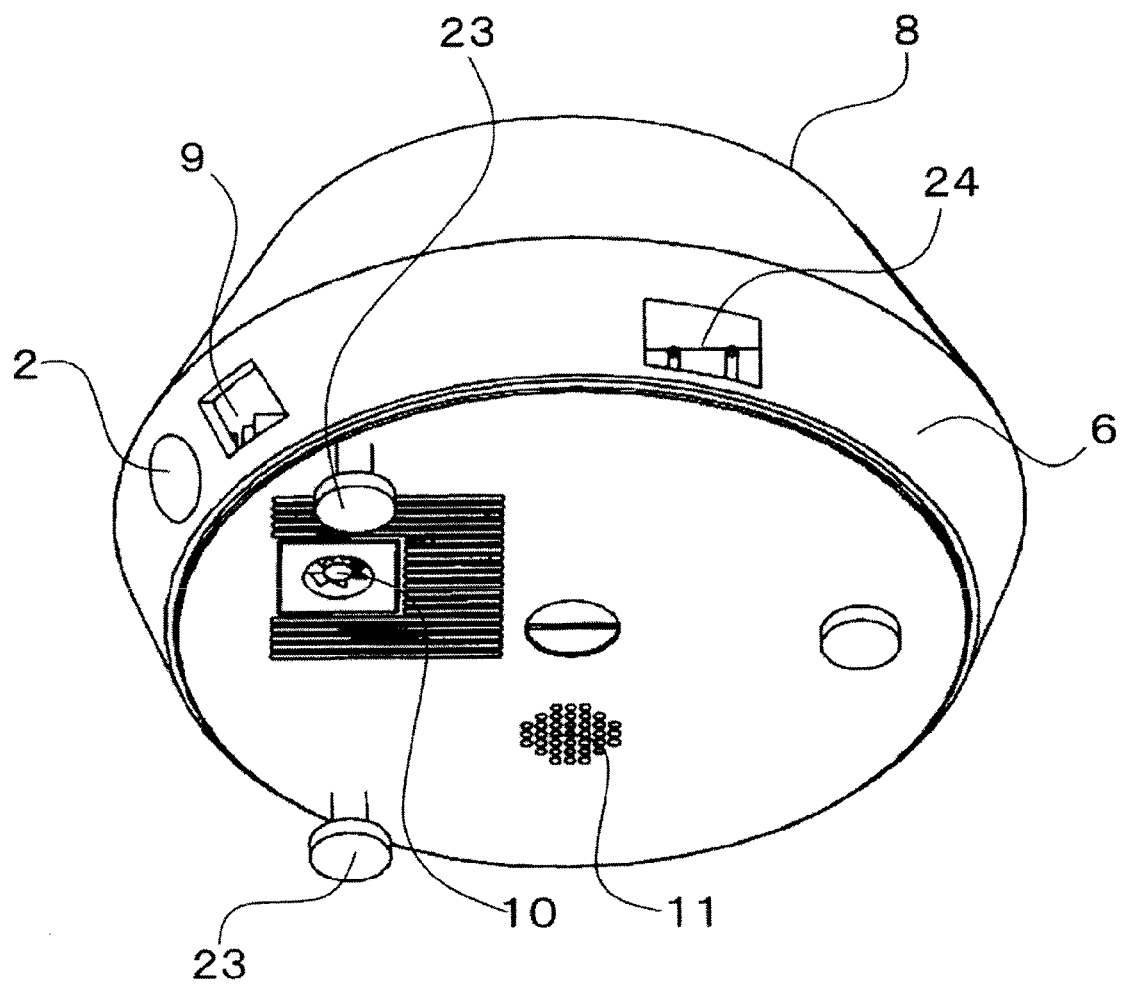
FIG. 11 is a perspective view from below of a lower case of the projector according to the first embodiment.

In addition, as illustrated in FIG. 10 and FIG. 11, a cooling air emission port 9 is provided in the vicinity of the projection port 2 on the outer circumferential surface of the lower case 6, and a cooling air intake port 10 and a loudspeaker sound emission port 11 are provided on the bottom surface of the lower case 6.

That is, when a blower 12 of the projection unit 5 illustrated in FIG. 10 is driven, cooling air is taken in the projection unit 5 of the lower case 6 from the cooling air intake port 10, and the air that has cooled the projection unit 5 and has become warm air is emitted to the outside of the lower case 6 through the cooling air emission port 9.

Less discomfort is given to the participants of the conference because the warm air to be emitted to the outside of the lower case 6 is emitted from the cooling air emission port 9 in the vicinity of the projection port 2.

That is, there is no probability that the warm air is blown toward the participants because the participants of the television conference do not take up positions in the vicinity of the projection port 2.

Figure 12:
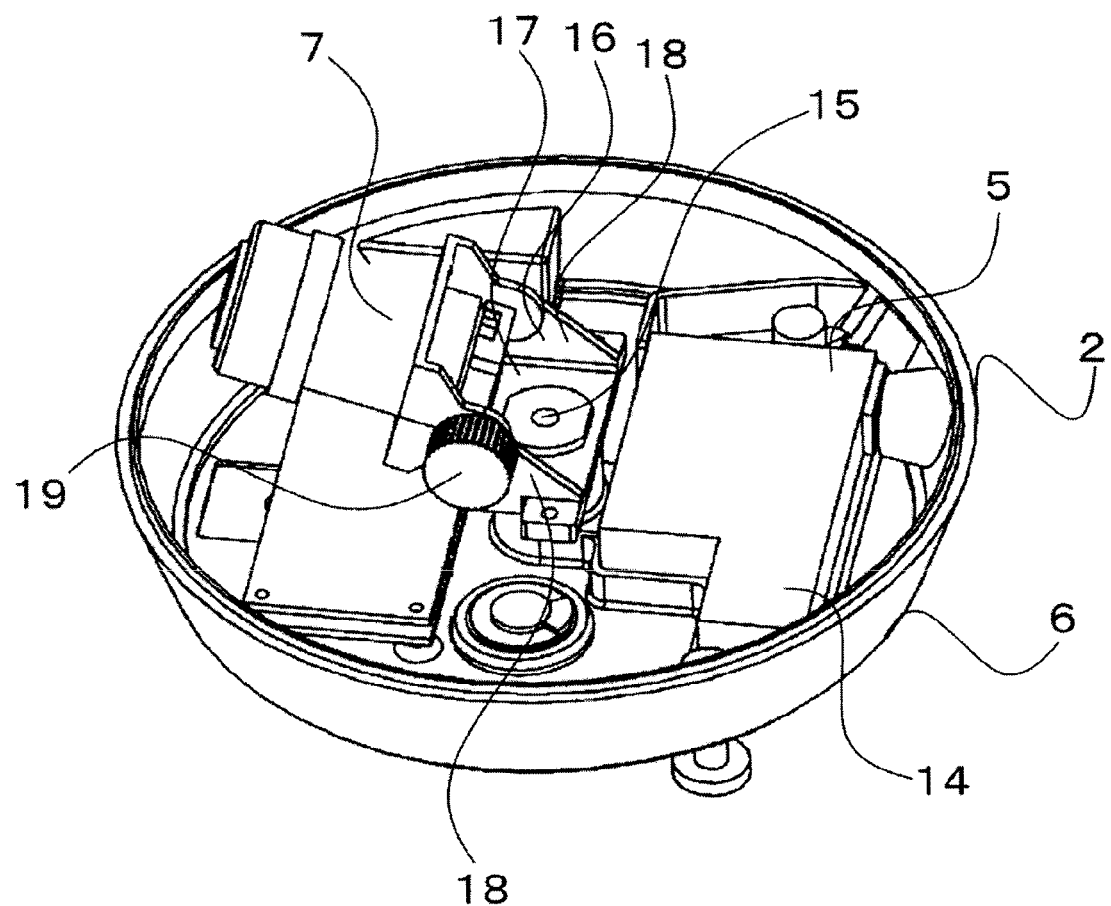
FIG. 12 is a perspective view from above of the lower case of the projector according to the first embodiment.
Figure 13:
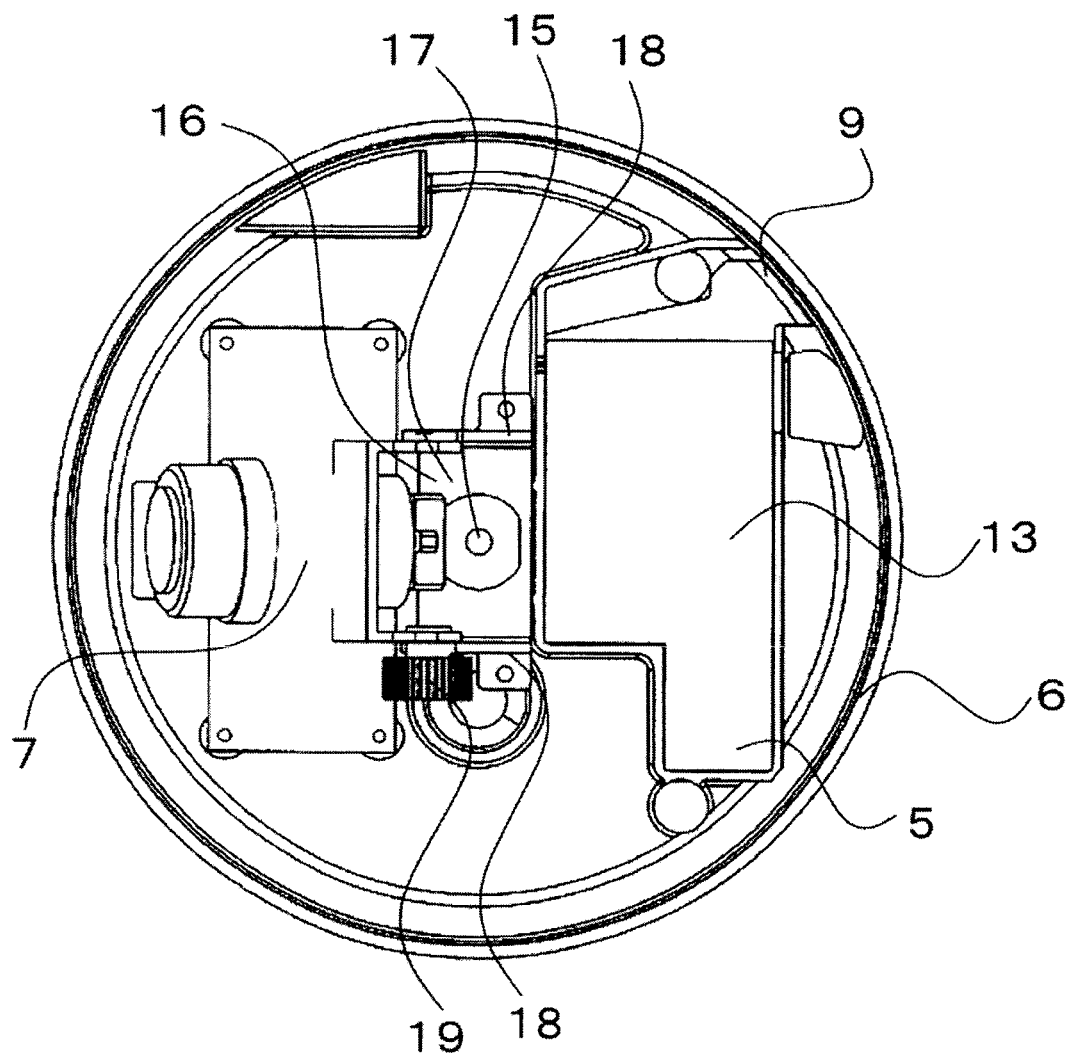
FIG. 13 is a plan view of the lower case of the projector according to the first embodiment.
Figure 14:
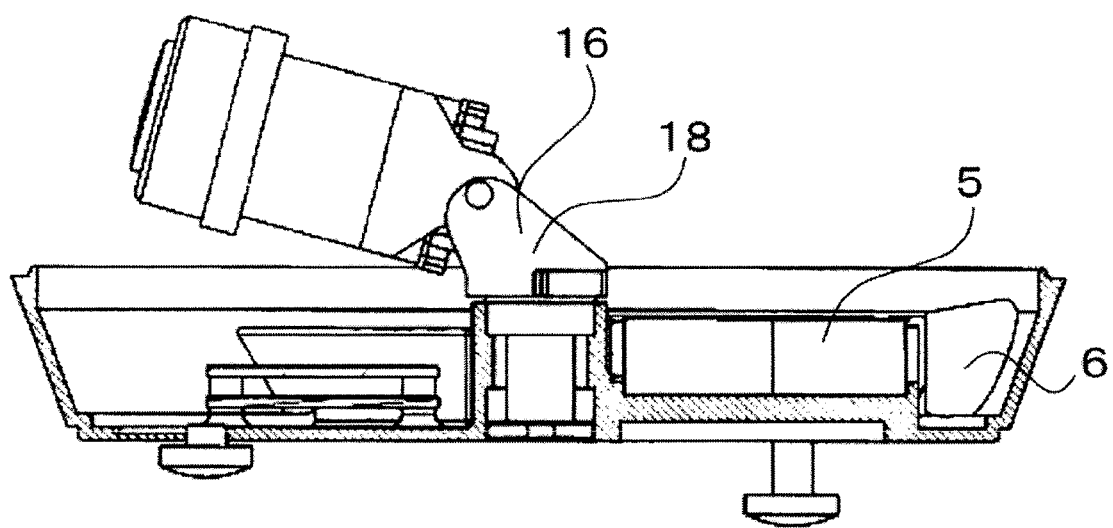
FIG. 14 is a cross-sectional view of the lower case of the projector according to the first embodiment.
Figure 15:
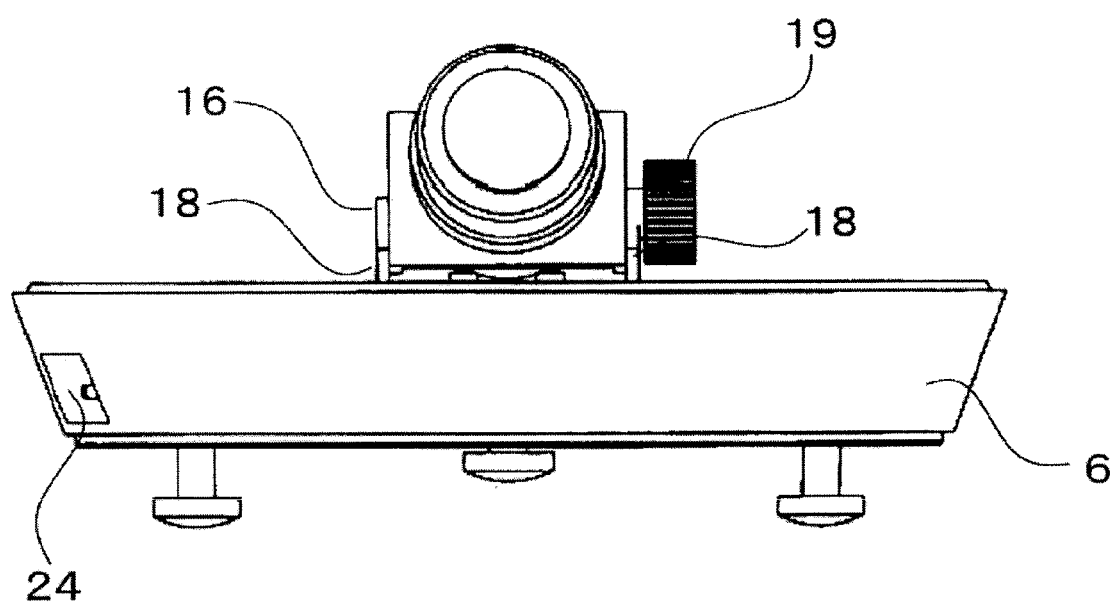
FIG. 15 is a front view of the lower case of the projector according to the first embodiment.

In addition, as will be seen from FIG. 13, an air sending path 13 that guides warm air to the cooling air emission port 9 is formed above the projection unit 5. FIG. 13 illustrates a state in which a top surface cover 14 of the projection unit 5 illustrated in FIG. 12 is omitted for explanation of the air sending path 13.

Next, the upper case 8 will be described that is rotatably arranged on the lower case 6 in the horizontal direction and houses the image taking unit 7.

As illustrated in FIGS. 9, 12, and 13, a rotating shaft 15 is erected at the central portion of the lower case 6, and the rotating shaft 15 can be rotated in the horizontal direction in the erection state.

In addition, as illustrated in FIGS. 12 to 14, and 17, a stand 16 is integrated with the upper part of the rotating shaft 15.

In the stand 16, a fixing unit 17 arranged in the center in the horizontal direction is integrated with the upper part of the rotating shaft 15, and as illustrated in FIGS. 12, 13, 15, and 17, the image taking unit 7 is mounted on an erection surface 18 that extends upward from the both sides of fixing unit 17 so that the angle of the image taking unit 7 is freely adjusted by an angle adjustment knob 19.

Figure 16:
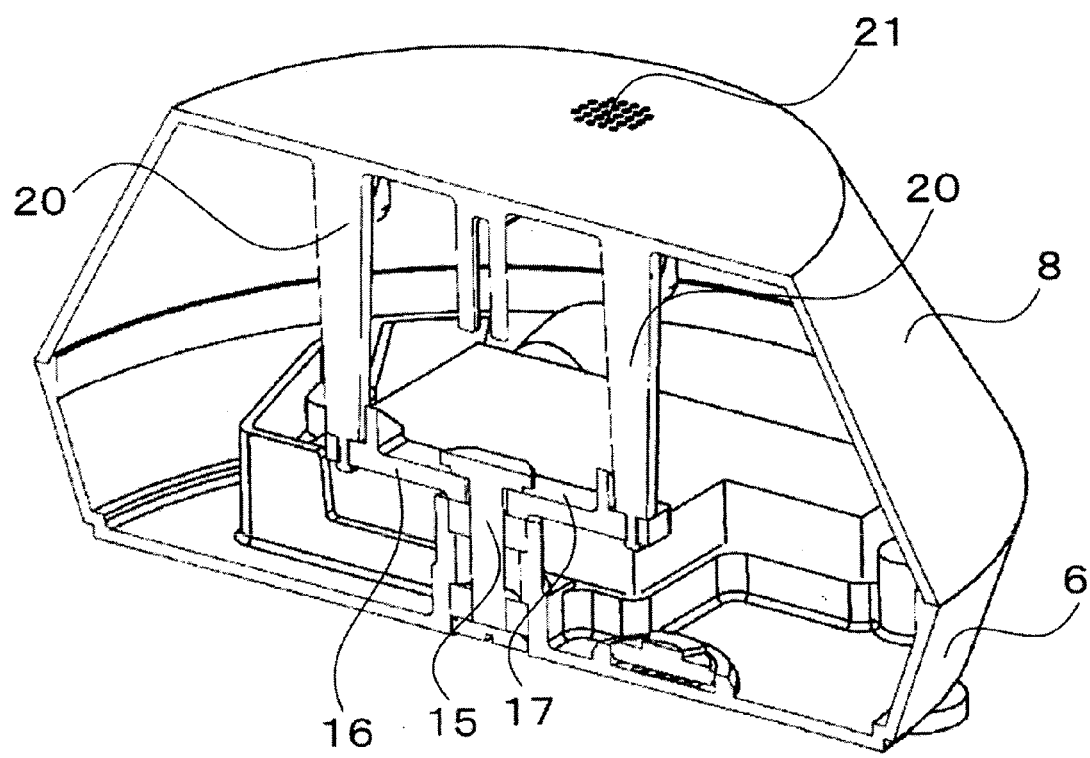
FIG. 16 is a perspective view when the lower case and an upper case of the projector are cut off according to the first embodiment.
Figure 17:
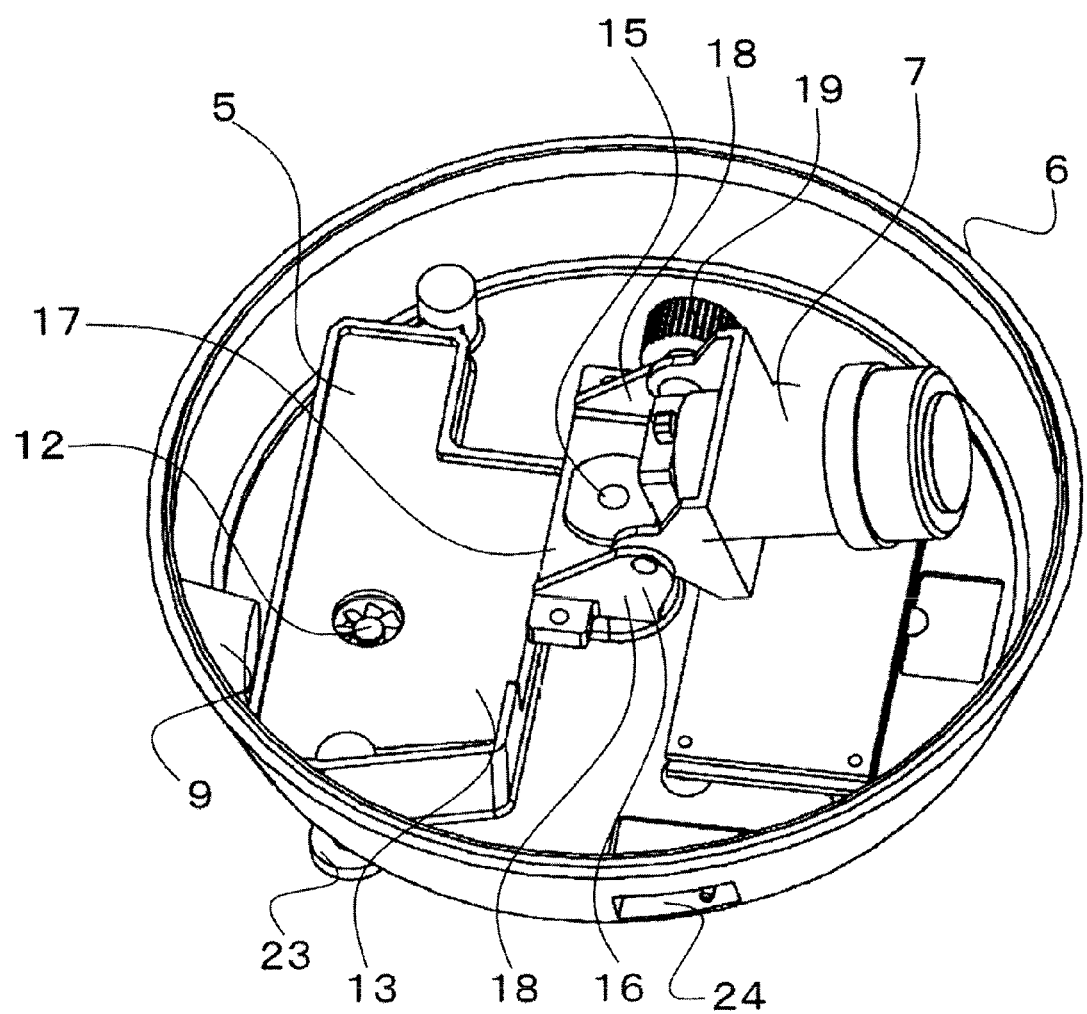
FIG. 17 is a perspective view from above of the lower case of the projector according to the first embodiment.

In addition, as illustrated in FIG. 16, the upper case 8 is integrated with the stand 16 by fixing a fixing piece 20 that extends downward from below the top surface to the fixing unit 17 of the stand 16.

That is, the stand 16 is fixed to the rotating shaft 15 that is rotatably arranged on the bottom surface of the lower case 6, and the image taking unit 7 is rotated integrally with the upper case 8 by integrating the image taking unit 7 and the upper case 8 with the stand 16 when the upper case 8 is rotated in the horizontal direction.

That is, in the television conference illustrated in FIG. 1, in a state in which a video image of the other site is projected from the projection port 2 onto the projection screen 3 illustrated in FIGS. 1 and 7 (that is, in a state in which the lower case 6 is not moved), when a speaker on the local site is changed, the image taking port 4 and the image taking unit 7 can be directed to the speaker merely by rotating the upper case 8 in the horizontal direction, providing a high level of operability.

In addition, the voice of the speaker on the local site can be effectively collected even when the upper case 8 is sequentially rotated depending on the speakers because the voice of the speaker is collected from a sound collection port 21 that is provided on the top surface of the upper case 8, to a microphone 22 illustrated in FIG. 9.

In addition, the voice of a speaker on the other site is emitted from the loudspeaker sound emission port 11 that is illustrated in FIG. 10 and that is provided on the bottom surface of the lower case 6, and as described above, the sound collection port 21 is provided on the top surface of the upper case 8, so that the occurrence of howling can be suppressed.

In further explanation on this respect, as described above, the lower case 6 has the cylindrical shape of which the diameter of the upper part is more enlarged than that of lower part in the outer circumferential surface, and the upper case 8 has the cylindrical shape of which the diameter of the lower part is more enlarged than that of upper part in the outer circumferential surface. That is, the lower case 6 and the upper case 8 have inclined surfaces, respectively. In this respect, sound emitted from the loudspeaker sound emission port 11 provided on the bottom surface of the lower case 6 is less likely to come around the sound collection port 21 provided on the top surface of the upper case 8, thereby improving the effect of suppressing the occurrence of howling.

In addition, air noises from the cooling air emission port 9 provided on the outer circumferential surface of the lower case 6 is less likely to come around the sound collection port 21 provided on the top surface of the upper case 8 by providing the above-described inclined surfaces on the outer circumferential surface of the lower case 6 and on the outer circumferential surface of the upper case 8, which is less likely to impair clearness of the sound.

In the first embodiment, an up-and-down leg 23 for projection adjustment is provided in the vicinity of the projection port 2 and in the rear part of the projection port 2 on the bottom surface of the lower case 6, so that the projection adjustment can be performed by adjusting the length of the up-and-down leg 23.

In addition, a power source supply terminal 24 is provided on the outer circumferential surface of the lower case 6.

Figure 18:
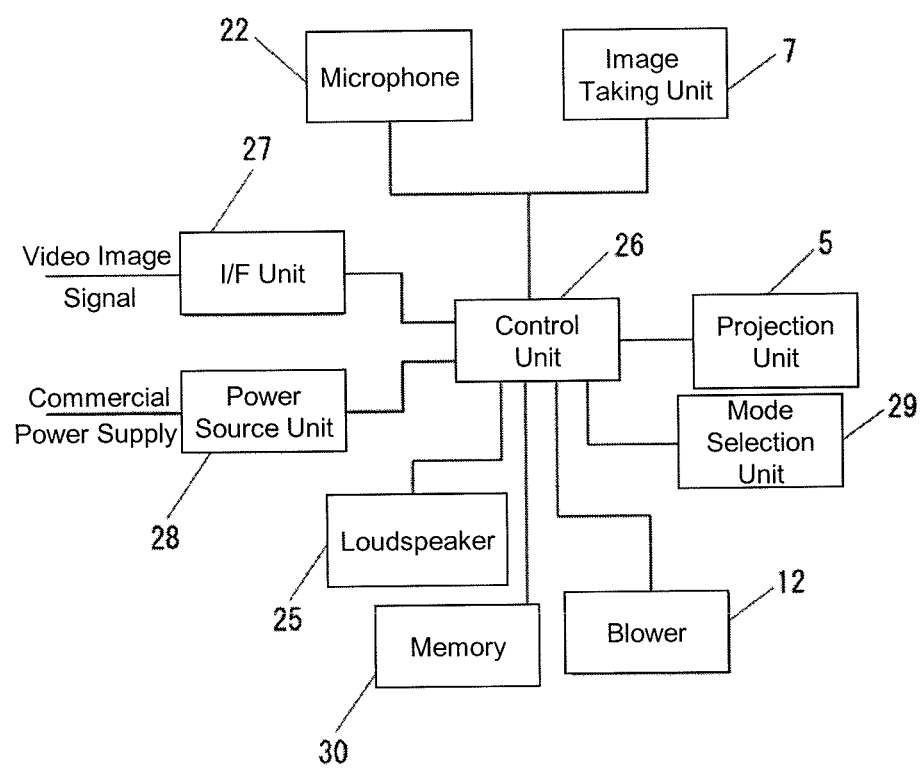
FIG. 18 is a control block diagram illustrating the projector according to the first embodiment.

FIG. 18 illustrates a control block diagram, and the projection unit 5, the image taking unit 7, the blower 12, the microphone 22, and a loudspeaker 25 arranged inside the loudspeaker sound emission port 11 are connected to a control unit 26.

In addition, the control unit 26 is connected to an input/output (I/F) unit 27 that is connected to at least one of the first personal computer 101 and the optical cable 300, and a power source unit 28 that leads to the power source supply terminal 24.

In addition, a mode selection unit 29 connected to the control unit 26 selects conference in the conference mode or conference in the material sharing mode between the members who are gathered at the first point 100 and the members who are gathered at the second point 200.

Figure 3:
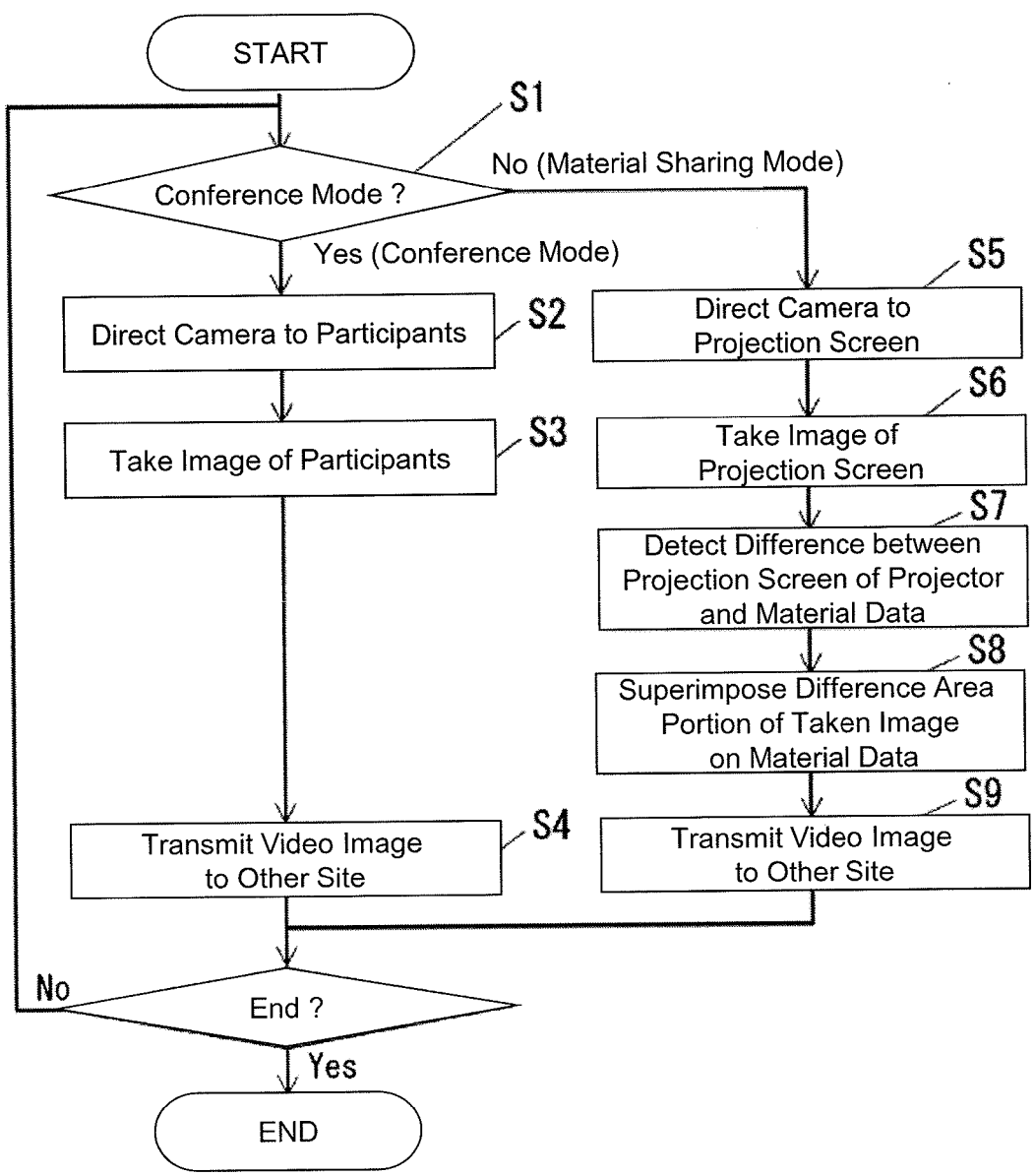
FIG. 3 is a flowchart illustrating the operation of the television communication system according to the first embodiment.

In the above-described configuration, when the conference proceeds while the members who are gathered at the first point 100 and the members who are gathered at the second point 200 look at the faces each other in the conference mode as shown in FIG. 1, the conference mode is selected in the mode selection unit 29 illustrated in FIG. 18 (S1 in FIG. 3).

In addition, the image taking ports 4 of the projectors 1 are directed to the participants at the first point 100 and the second point 200, respectively (S2 in FIG. 3).

Therefore, the faces of the members who are gathered at the first point 100 are taken by the image taking unit 7 through the image taking port 4 of the projector 1 at the first point 100, and the faces are projected from the projection unit 5 of the projector 1 at the second point 200 onto the projection screen 3 at the second point 200 through the projection port 2.

On the contrary, the faces of the members who are gathered at the second point 200 are taken by the image taking unit 7 through the image taking port 4 of the projector 1 at the second point 200, and the faces are projected from the projection unit 5 of the projector 1 at the first point 100 onto the projection screen 3 of the first point 100 through the projection port 2 (S3 and S4 in FIG. 3).

That is, when the conference mode is selected by the mode selection unit 29 of each of the projectors 1 at the first point 100 and the second point 200, the conference can proceeds while the members who are gathered at the first point 100 and the members who are gathered at the second point 200 look at the faces of the participating members that are projected on the respective projection screens 3 located at the first point 100 and the second point 200, each other.

In addition, in the conference mode, in the state in which a video image of the other site is projected from the projection port 2 onto the projection screen 3 illustrated in FIGS. 1 and 7 (that is, the state in which the lower case 6 is not moved), when a speaker on the local site is changed, the image taking port 4 and the image taking unit 7 can be directed to the speaker merely by rotating the upper case 8 in the horizontal direction, providing a high level of operability.

In addition, the voice of the speaker on the local site can be effectively collected even when the upper case 8 is sequentially rotated depending on the speakers because the voice of the speaker is collected from a sound collection port 21 that is provided on the top surface of the upper case 8, to a microphone 22 illustrated in FIG. 9.

In addition, the voice of the speaker on the other site is emitted from the loudspeaker sound emission port 11 that is illustrated in FIG. 10 and that is provided on the bottom surface of the lower case 6, and as described above, the sound collection port 21 is provided on the top surface of the upper case 8, so that the occurrence of howling can be suppressed.

Next, when the conference is performed in the material sharing mode illustrated in FIG. 6, the material sharing mode is selected by each of the mode selection units 29 of the projectors 1 at the first point 100 and the second point 200 (S1 in FIG. 3).

Therefore, in the first embodiment, as shown in FIG. 1, information held in the first personal computer 101 at the first point 100 is projected from the projection units 5 of the projectors 1 at the first point 100 and the second point 200 onto the projection screens 3, respectively.

As a result, the conference can proceeds while the information held in the first personal computer 101 is shared between the members who are gathered at the first point 100 and the members who are gathered at the second point 200.

In such a material sharing mode, the conference can proceeds while the information held in the first personal computer 101 is shared between the members who are gathered at the first point 100 and the members who are gathered at the second point 200 as described above. Accordingly, for example, a participating member at the first point 100 may say, "There is a problem here in the graph," as shown in FIG. 1.

The voice reaches the participating members of the second point 200, however the conference may not proceed smoothly because the members who are gathered at the second point 200 may not perceive the location of the projected image pointed by the one of the members who are gathered at the first point 100.

Therefore, in the first embodiment, when the material sharing mode is selected by the mode selection unit 29 of the projector 1, the image taking port 4 of the projector 1 at the first point 100 is directed to the projection screen 3 of the first point 100 (S5 in FIG. 3).

Thus, at the first point 100, the information held in the first personal computer 101 is projected from the projection unit 5 of the projector 1 onto the projection screen 3 through the projection port 2, so that the state of the projection screen 3 is taken by the image taking unit 7 through the image taking port 4 of the projector 1 at the first point 100 (S6 in FIG. 3).

That is, in the first embodiment, in the material sharing mode, a video image from the first personal computer 101 ("a" in FIG. 2) is projected onto the projection screen 3 by the projection unit 5 of the projector 1 at the first point 100 while the projected video image on the projection screen 3 is taken by the image taking unit 7.

Figure 2:
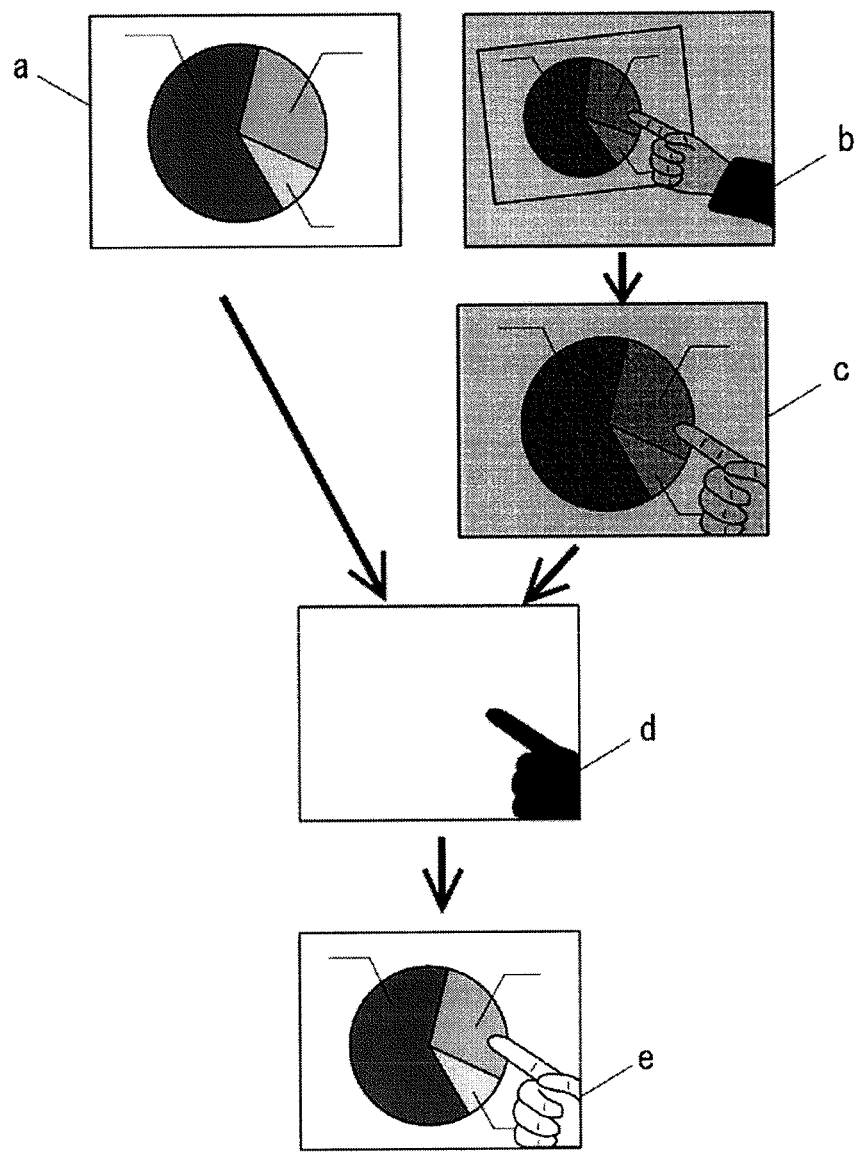
FIG. 2 is a diagram illustrating an operation of the television communication system according to the first embodiment.

In addition, the video image taken by the image taking unit 7 of the first point 100 is compared with a supply video image supplied from the first personal computer 101 to the projector 1 at the first point 100 by the control unit 26 of the projector 1 at the first point 100 or by the first personal computer 101, and a difference video image generated based on the comparison is detected ("d" in FIG. 2 and S7 in FIG. 3).

Next, the control unit 26 of the projector 1 at the first point 100 or the first personal computer 101 superimposes the difference video image on the supply video image supplied from the first personal computer 101 to the projector 1 at the first point 100 ("e" in FIG. 2 and "S8" in FIG. 3), and supplies the superimposed video image to the projector 1 at the second point 200 (S9 in FIG. 3).

Therefore, the members at the second point 200 can properly perceive the location of the projected image pointed by the members at the first point 100, and the communication between the first point 100 and the second point 200 proceeds smoothly.

In addition, basically, data supplied to the projector 1 at the second point 200 is information held in the first personal computer 101 and is displayed clearly at the second point 200, so that, at this respect, the communication between the first point 100 and the second point 200 is performed smoothly.

In addition, when a difference video image is transmitted to the second point 200, a location to be pointed in the projected image can be pointed, for example, by using a finger or by superimposing another shaped object in order to express their intention properly by the members at the first point 100, so that, at this respect, the communication between the first point 100 and the second point 200 proceeds smoothly.

The "b" in FIG. 2 illustrates a state in which a video image of the projection screen 3 at the first point 100 is taken by the image taking unit 7, and the comparison is performed by modifying the video image of the "b" in FIG. 2 as illustrated in the "c" in FIG. 2 because the video image is distorted in this state to become difficult to be compared with the information held in the first personal computer 101.

Figure 4:
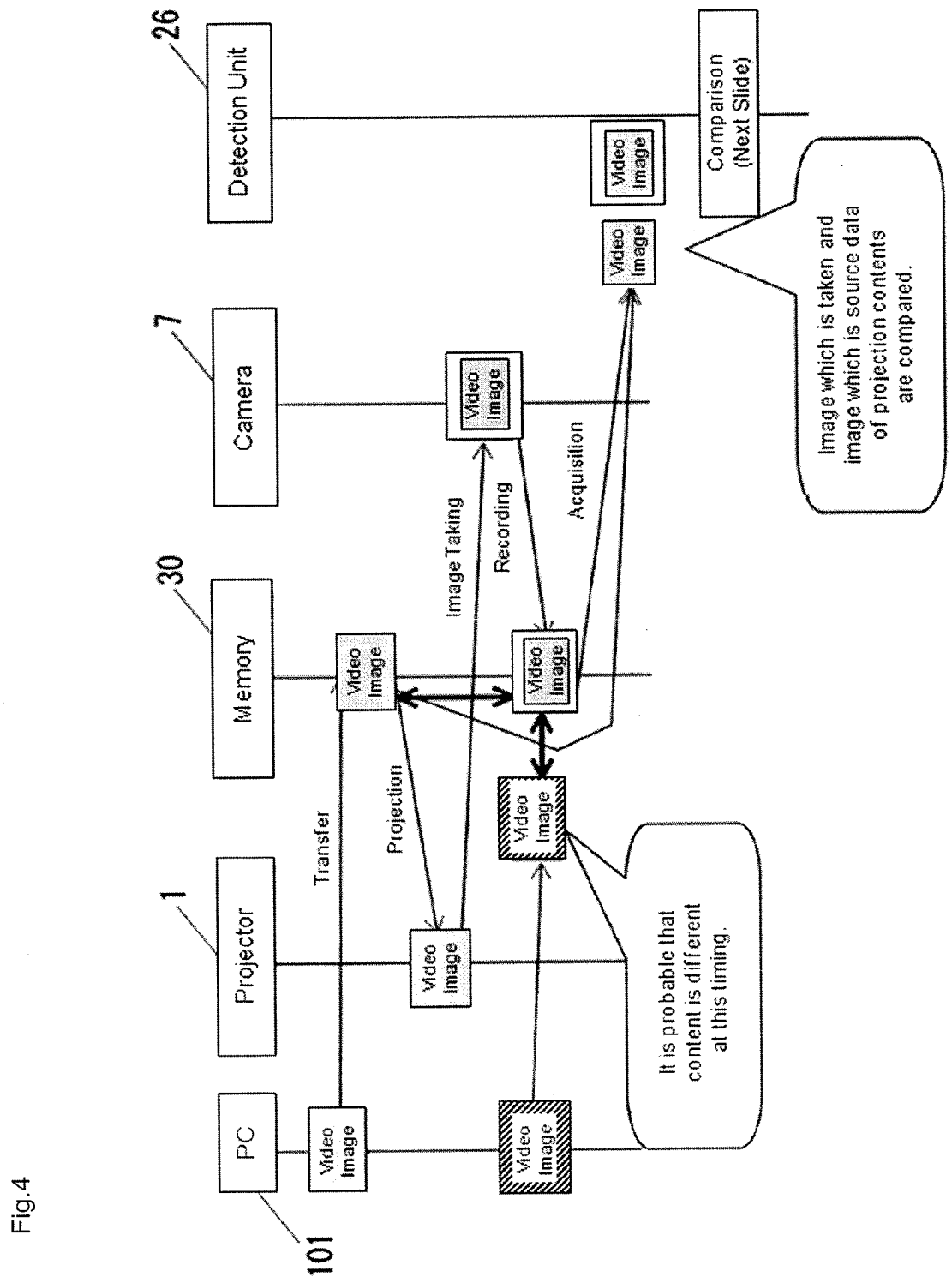
FIG. 4 is a sequence diagram illustrating the operation of the television communication system according to the first embodiment.

In addition, FIG. 4 illustrates a timing at which the comparison is performed.

That is, as illustrated in FIG. 4, a memory 30 is provided in the projector 1, and the memory 30 is connected to the control unit 26.

In addition, when the material sharing mode is active, a video image is stored from the first personal computer 101 to the memory 30, and the video image stored in the memory 30 is projected by the projection unit 5.

In addition, a projected video image from the projection unit 5 is taken by the image taking unit 7, the taken video image is stored in the memory 30.

Such two video images are stored in the memory 30, so that the comparison of the two video images in the control unit 26 is performed easily.

When information of the taken projected video image stored in the memory 30 in the second time and a video image that is being output from the first personal computer 101 at that time are compared, it is desirable to use the memory 30 in this way because a difference may occur due to time lag.

In addition, in the above-described first embodiment, at the second point 200, a personal computer is not provided, and alternatively, a personal computer may be provided at the second point 200 and connected to the projector 1, so that materials can be given from the both directions.

In addition, the comparison of a taken video image by the image taking unit 7 with information held in the first personal computer 101 may be performed in the control unit 26 of the projector 1 or a personal computer connected to the control unit 26.

Second Embodiment

A second embodiment of the present invention will be described with reference to the accompanying drawings.

Figure 19:
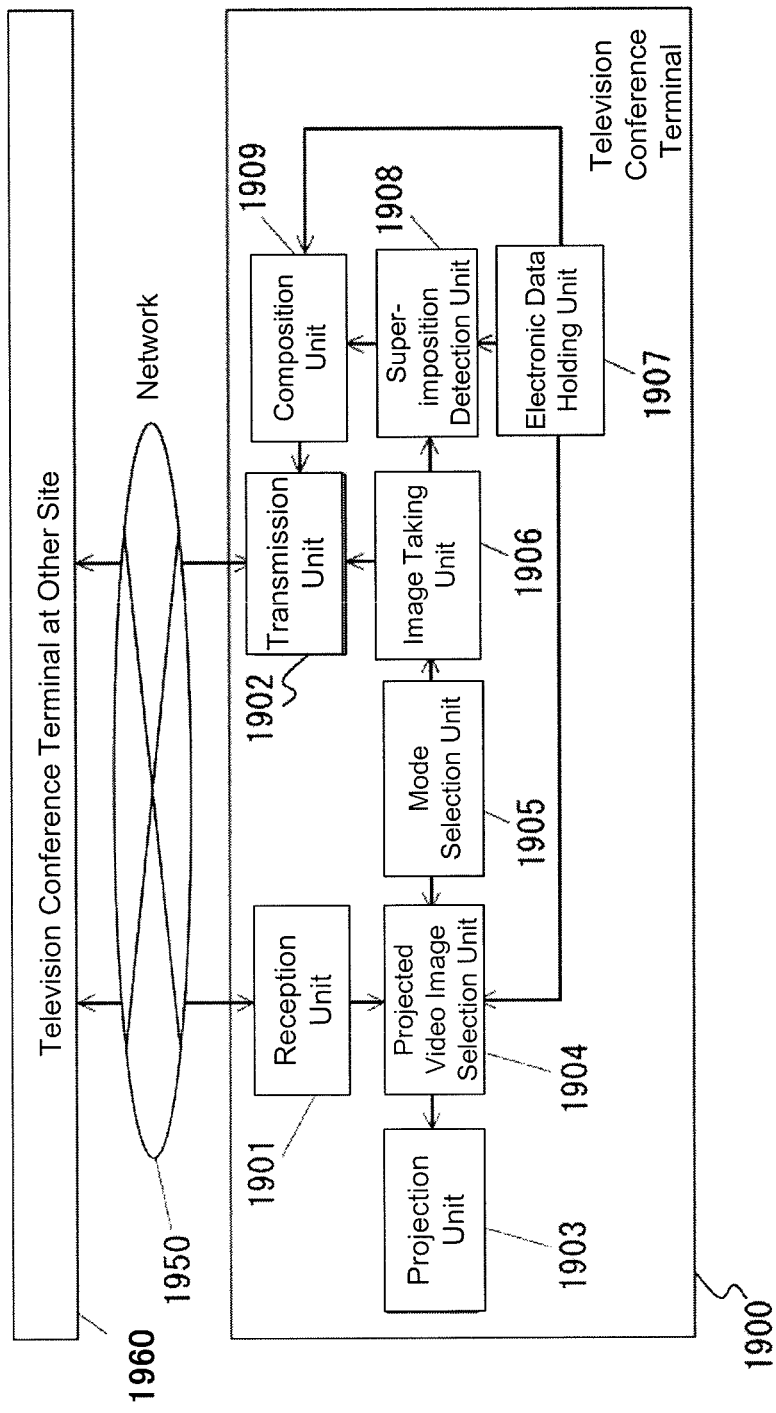
FIG. 19 is a block diagram illustrating a television conference terminal according to a second embodiment of the present invention according to the second embodiment.

FIG. 19 is a block diagram illustrating a configuration of a television conference terminal 1900 according to the second embodiment of the present invention.

The television conference terminal 1900 is connected to a television conference terminal 1960 at other site through a network 1950. The television conference terminal 1900 includes a reception unit 1901 and a transmission unit 1902 that perform reception and transmission of data from and to the television conference terminal 1960 at the other site, a projection unit 1903 that performs projection, a mode selection unit 1905 that select a conference mode or a material sharing mode, an image taking unit 1906 such as a camera, an electronic data holding unit 1907 that holds electronic data of a material to be shared in the material sharing mode, a superimposition detection unit 1908 that detects objects superimposed on the projected material, and a composition unit 1909 that composites the electronic data of the material with the detected superimposed objects.

The reception unit 1901 includes a communication function, receives a video image of the state of the conference at the other site from the television conference terminal 1960 at the other site through the network 1950, and transmits the received data to a projected video image selection unit 1904.

The selection unit 1905 switches between the conference mode and the material sharing mode. In this case, the mode selection unit 1905 performs switching of two modes of the conference mode and the material sharing mode based on an instruction from a user, and transmits information on the switched mode to the projected video image selection unit 1904, the image taking unit 1906, and the transmission unit 1902. In the conference mode, taken video images of conference participants at the two sites are transmitted to each other, a video image transmitted from the other site is projected at the local site. In the material sharing mode, a material held at the local site is shared with the other site, and the material is projected at the local site and the other site. As a switching method of modes, a method for performing selection using a switch provided in a main body and a method for automatically detecting and setting the orientation of the image taking unit 1906 (the conference mode is set when a camera is directed to a participant, and the material sharing mode is set when the camera is directed to a projection screen) are conceivable.

The electronic data holding unit 1907 holds electronic data of a material used in the material sharing mode. The electronic data holding unit 1907 is not necessarily installed in the main body of the television conference terminal 1900, and alternatively a mere interface (for example, a display cable, wireless LAN, etc.) is provided in the television conference terminal 1900 and data may be allowed to be input by connecting an external terminal (a laptop personal computer, a recording medium, etc.) to the television conference terminal 1900.

The projected video image selection unit 1904 selects contents to be projected depending on the mode. The projected video image selection unit 1904 transmits a video image that represents the state of the conference at the other site and that is received from the reception unit 1901, to the projection unit 1903 when a mode transmitted from the mode selection unit 1905 is the conference mode, and the projected video image selection unit 1904 transmits the electronic data of the material held by the electronic data holding unit to the projection unit 1903 when a mode transmitted from the mode selection unit 1905 is the material sharing mode.

The projection unit 1903 is, for example, a projector or a display and includes a function to project a video image. The projection unit 1903 projects the video image transmitted from the projected video image selection unit 1904.

The image taking unit 1906 is, for example, a camera, etc. and includes an image taking function. The image taking unit 1906 regards the video image projected by the projection unit 1903 and the participants of the conference as targets within an image taking range. The image taking unit 1906 takes an image of the participants of the conference and transmits the taken video image to the transmission unit 1902 in the conference mode, and performs image taking so as to regard the projection screen projected by the projection unit 1903 as a target and transmits the projected video image to the superimposition detection unit 1908 in the material sharing mode. The image taking unit 1906 may include a pan-and-tilt function or a wide-angle image taking function in order to regard the participants of the conference and the video image projected by the projection unit 1903 as target within the image taking range. When the image taking unit 1906 includes the pan-and-tilt function, the orientation of the camera is changed so that the participants of the conference are taken in the conference mode and the video image projected by the projection unit 1903 is taken in the material sharing mode. The orientation of the camera may be set beforehand by the user or may be moved manually.

The superimposition detection unit 1908 detects, in the material sharing mode, whether or not a part of a body (for example, the proximal end of a hand, etc.) of the participants of the conference, an object (a pointing stick, etc.) or light beam (light beam of a laser pointer, etc.) are superimposed onto the projection screen projected by the projection unit 1903. Here, to "superimpose" is to arrange an pointing object (tip of a finger, a pointing stick, light beam of a laser pointer, etc.) to point a location on the projected video image by the participants of the conference in the conference, between the image taking unit 1906 and the projection screen (in a state in which the pointing object is superimposed on the projected video image) (for example, a hand of the participant is superimposed onto the projection screen 3 at the first point 100 in FIG. 1). The superimposition detection unit 1908 detects the superimposition based on the electronic data of the material held by the electronic data holding unit 1907 and the video image in which the material taken by the image taking unit is projected, and transmits information on the detected superimposition to the composition unit 1909. The information on the superimposition includes superimposition coordinate information of a superimposed area and a superimposition video image that is a video image of the superimposed area among the video images taken by the image taking unit 1906.

The composition unit 1909 composites the superimposition video image received from the superimposition detection unit 1908 and the electronic data of the material held by the electronic data holding unit 1907. In the combination, for example, as illustrated in the "e" of FIG. 2, the superimposition video image is composited with the electronic data at the position corresponding to the superimposition coordinate information on the video image of the electronic data of the material. Alternatively, a graphic symbol such as a pointer and an icon may be superimposed on the electronic data instead of the superimposition video image at the position corresponding to the superimposition coordinate information on the video image of the electronic data of the material. The composited video image data is transmitted to the transmission unit 1902. The composition unit 1909 may not be provided in the terminal at the local site, and alternatively, the transmission of the information on the superimposition and the electronic data of the material may be performed in the terminal at the local site to perform the process such as the combination at the other side. The mere electronic data of the material and the superimposition coordinate information are transmitted from the terminal 1900 at the local site to the terminal 1960 at the other site, and a pointer and an icon prepared by the terminal 1960 at the other site may be composited with the electronic data of the material based on the superimposition coordinate information.

The transmission unit 1902 transmits the video image transmitted from the image taking unit 1906, to the television conference terminal 1960 at the other site when a mode transmitted from the mode selection unit 1905 is the conference mode, and transmits the video image transmitted from the composition unit 1909, to the television conference terminal 1960 at the other site when a mode transmitted from the mode selection unit 1905 is the material sharing mode.

The case will be described in which there are the local site and the other site, and alternatively, in television conference in which three sites or more are connected to each other, the same operations may be performed from a terminal of local site to two or more of the other sites in a case of a peer-to-peer connection type, and the terminals at the other sites may be replaced with a multipoint connection unit (MCU) in a case where the television conference is performed through the MCU.

Figure 20:
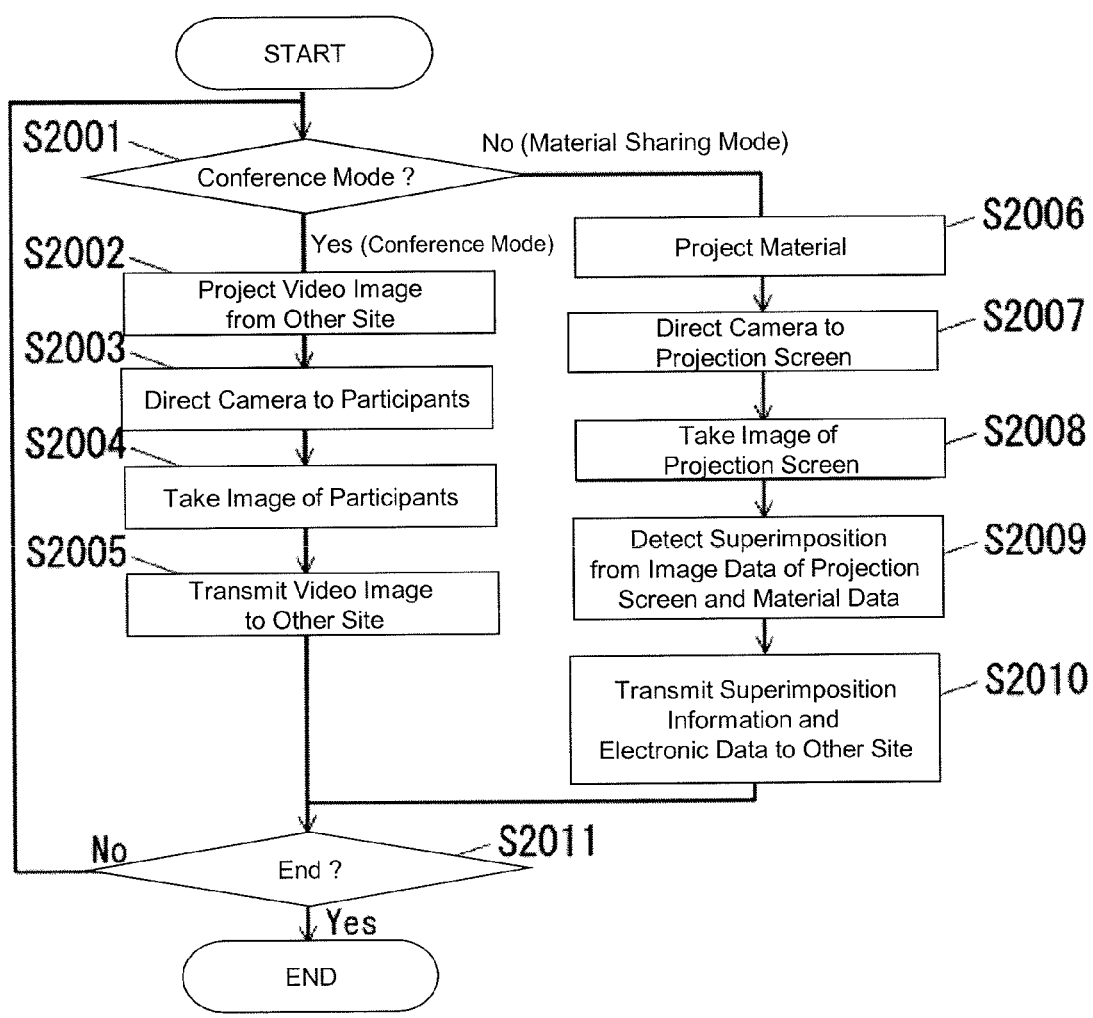
FIG. 20 is a flowchart illustrating an operation of the television conference terminal according to the second embodiment.

FIG. 20 is a flowchart illustrating an operation of the television conference terminal 1900 according to the second embodiment of the present invention. The operation of the television conference terminal 1900 will be described with reference to the flowchart.

First, a case will be described in which the conference mode is selected in the mode selection unit 1905 (Yes in S2001). In the conference mode, the projection unit 1903 projects the video image received from the other site by the reception unit 1901 (S2002). After that, the camera of the image taking unit 1906 is directed to the participants (S2003), the image taking unit 1906 takes an image of the participants (S2004), and the transmission unit 1902 transmits the taken video image to the other site (S2005). After that, a case will be described in which the material sharing mode is selected in the mode selection unit 1905 (No in S2001). In the material sharing mode, the projection unit 1903 projects the electronic data of the material held by the electronic data holding unit 1907 onto the projection screen (S2006). After that, the camera of the image taking unit 1906 is directed to the projection screen projected by the projection unit 1903 (S2007), and the image taking unit 1906 takes an image of the projection screen (S2008). The superimposition detection unit 1908 detects the superimposition based on the video image taken by the image taking unit 1906 and the electronic data of the material (S2009), and the video image in which the electronic data of the material is composited with the superimposition contents is created based on the detection contents and transmitted to the other site (S2010). Finally, it is determined whether or not the television conference terminal is terminated (S2011), and when the television conference terminal is not terminated (No in S2011), the flow returns to S2001, and the operation depending on the mode is continued. When the television conference terminal is terminated (Yes in S2011), the operation of the television conference terminal ends.

Figure 21:
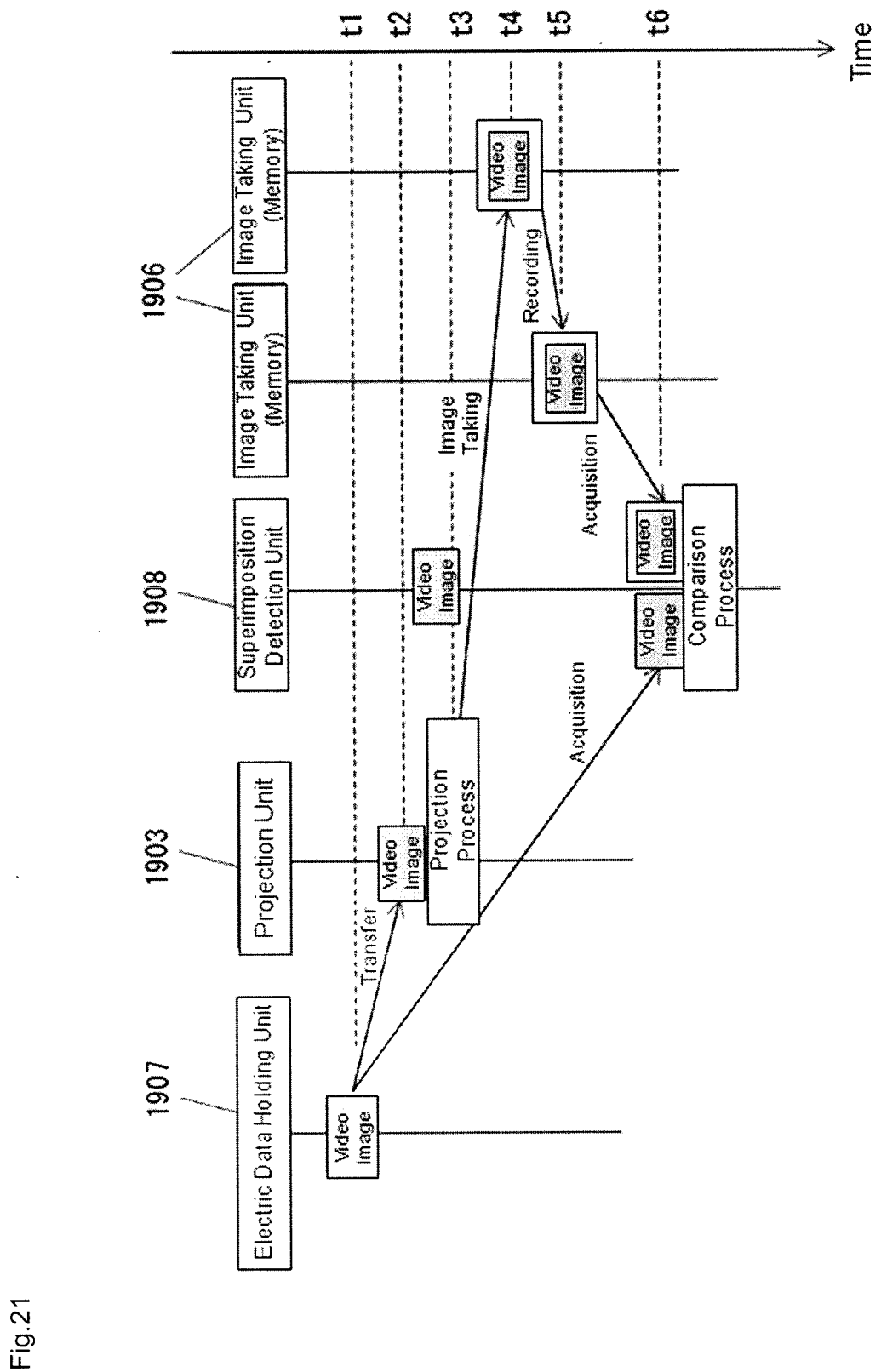
FIG. 21 is a sequence diagram illustrating a data flow of the television conference terminal according to the second embodiment.

After that, a case where the superimposition is detected will be described in detail. FIG. 21 is a sequence diagram illustrating a data flow of the television conference terminal according to the second embodiment. The electronic data of the material held by the electronic data holding unit 1907 is a video image, a material for a slide, etc. and it is probable that the contents change with a time. Therefore, electronic data corresponding to a projected video image of a material taken by the image taking unit 1906 is desired to be used when the superimposition is detected. An obtaining timing of the video image taken by the image taking unit 1906 and the electronic data of the material held by the electronic data holding unit 1907 that are used to detect the superimposition by the superimposition detection unit 1908 will be described in detail with reference to FIG. 21.

First, video image transfer of the material from the electronic data holding unit 1907 is started at a time t1, the projection unit 1903 receives the electronic data at a time t2, the projection process is performed at a time t3. At a time t4, the image taking unit 1906 takes an image of the projected video image projected at the time t3, and the projected video image is recorded in the memory of the image taking unit 1906 at a time t5. In the superimposition detection unit, the projected video image is obtained from the memory of the image taking unit 1906 at a time t6. That is, electronic data held by the electronic data holding unit corresponding to the projected video image obtained at the time t6 is desired to be the electronic data at the time t1. When electronic data obtained at a different time and the projected video image obtained at the time t6 are compared, proper comparison may not be achieved. As described above, the superimposition detection unit performs data comparison in consideration with time lag from the time t6 to the time t1.

When the superimposition detection unit detects the superimposition, the method described using FIG. 2 in the first embodiment may be used. The "a" in FIG. 2 corresponds to the electronic data of the material held by the electronic data holding unit at the time t1 in FIG. 21, and the "b" in FIG. 2 corresponds to the projected video image that is taken by the image taking unit 1906 at the time t4 in FIG. 21 and read by the superimposition detection unit at the time t6. As illustrated in the "c" in FIG. 2, the projected video image is corrected to be compared with the electronic data because the projected video image and the electronic data cannot be compared directly. The correction may be performed so that the clipping of only the projected area is performed by taking advantage of the fact that the brightness of the projected area is high. After that, as illustrated in the "d" in FIG. 2, a difference area between the material data and the corrected projected video image is detected. The difference area is a portion on which a part of a human body, etc. is superimposed. In the detection of the difference area, a method used in a general image recognition technology may be employed, and the comparison may be made easily by performing the correction of the brightness of each image and a color tone. At last, with the difference area detected as illustrated in the "e" of FIG. 2, an image is created in which the image of the corrected projected video image in the "c" in FIG. 2 is composited, and with the remaining area, an image is created in which the image of the electronic data of the material in the "a" in FIG. 2 is composited. The projected video image may not be composited with the whole difference area, and alternatively, a part of the difference area may be composited with the projected image. As a result, an area that covers the material screen can be reduced. FIGS. 22A to 22C are examples in which a part of the difference area is composited with the projected image. FIG. 22A illustrates a detected difference area (superimposition area). For the difference area, FIG. 22B illustrates an example in which the whole difference area is replaced with the projected image. FIG. 22C is an example in which a part of the difference area (portion corresponding to a fingertip) is replaced with the projected image. In FIG. 22C, the material data hidden in FIG. 22B can be seen.

Figure 23:
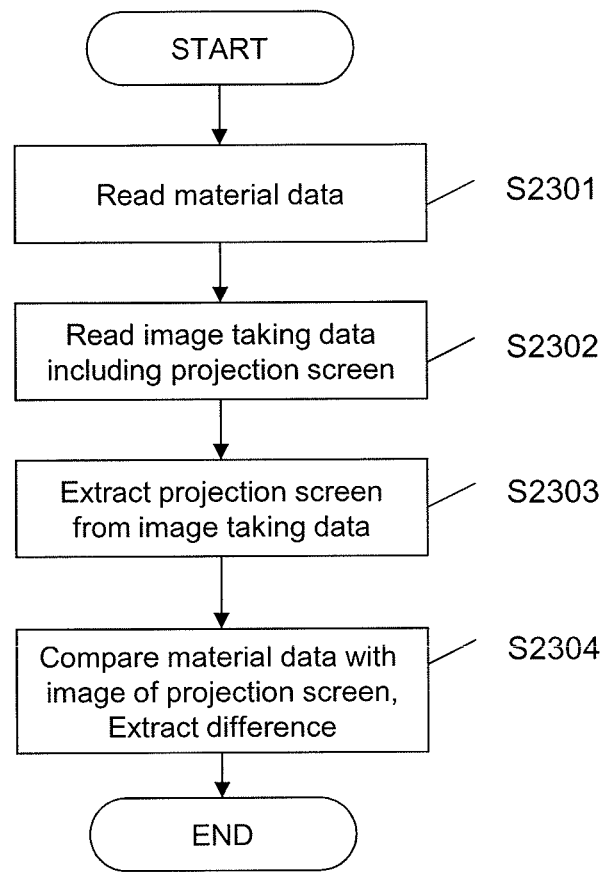
FIG. 23 is a flowchart illustrating an operation of the superimposition detection unit according to the second embodiment.

FIG. 23 is a flowchart illustrating an operation of the superimposition detection unit 1908 according to the second embodiment of the present invention. An operation performed when the superimposition is detected will be described below with reference to FIG. 23. First, the superimposition detection unit 1908 reads the electronic data of the material held by the electronic data holding unit 1907 (S2301). After that, the superimposition detection unit 1908 reads the taken image data that includes the projection screen and is taken by the image taking unit 1906 (S2302). The superimposition detection unit 1908 extracts a location corresponding to the projection screen from the taken image data (S2303). In the extraction method, the location corresponding to the projection screen may be obtained based on the information when the location of the projection screen is known beforehand (for example, when positional relationship of the projection screen and the image taking unit 1906, and view angle information of the camera of the image taking unit 1906 are known, the location corresponding to the projection screen in the taken image data can be calculated) in addition to the extraction method in which an area having high brightness is detected as the projection screen, as described above. After that, the image of the projection screen extracted from the taken image data and the material data are compared, and the difference area is extracted (S2304). The extracted difference area corresponds to the pointing object.

The video image projected by the projection unit 1903 in the terminal at the local site in the material sharing mode is the electronic data of the material held by the electronic data holding unit, and alternatively, a video image output by the composition unit 1909 may be projected. The display at the other site can be known by the participants at the local site because the video image output by the composition unit 1909 is a video image displayed in the terminal at the other site, so that it can be determined whether or not characters, etc. of the material are hidden by an icon or a pointer. In this case, the superimposition detection unit 1908 may compare the output of the image taking unit 1906 with the output of the composition unit 1909 to obtain the difference in order to detect the superimposition.

In addition, the conference mode and the material sharing mode may be operated together in parallel. In this case, the projected video image selection unit 1904 divides the screen, projects a video image at the other site received from the reception unit 1901, on the right side of the divided screen, and projects the electronic data of the material received from the electronic data holding unit 1907, on the left side of the divided screen.

In addition, as the method in which the superimposition detection unit 1908 detects whether or not an pointing object is located between the image taking unit 1906 and the projection screen, a detection method using anything other than the difference may be employed. For example, the shape of the pointing object is learned beforehand, and the learned pointing object may be detected in the image. In addition, the image taking unit 1906 may be a ranging-enabled camera such as a stereo camera and whether or not the pointing object is located between the image taking unit 1906 and the projection screen may be detected using the ranging result.

As described above, in the second embodiment of the present invention, the problem is solved that when the participants of the conference point the projection screen of the material in the material sharing mode of television conference, the participants at the other site do not perceive the pointed location, so that the pointed location can be perceived with a sense of presence. The method in which such material data and such a projection screen are compared to detect the pointed location is particularly suitable to detect an object the shape of which is easily changed such as a part of a human body, etc. without learning the shape of a pointer, etc. beforehand.

As described above, in the television communication system of the present invention, when the material sharing mode using the first projector and the second projector is active, a video image from a first personal computer is projected on a first projection screen by a first projection unit of the first projector, the projected video image on the first projection screen is taken by the first image taking unit, the taken video image by the first image taking unit is compared with a supply video image supplied from the first personal computer to the first projector by a first control unit of the first projector or the first personal computer, a difference video image based on the comparison is transmitted from the first projector or the first personal computer to the second projector so as to be superimposed on the supply video image from the first personal computer to the first projector.

Therefore, for example, in a case where the intention can be conveyed more properly, such as by pointing the projected image by a finger or by superimposing another shaped object to express a location of interest or to convey what should be pointed, the video image of the points of interest can be projected from the second projector at the second point onto a second projection screen, thereby causing the communication between the first point and the second point to proceed smoothly.

Therefore, the television communication system of the present invention is expected to be used for television conference, etc.

What is claimed is:

1. A television communication terminal participating in a video conference at a first site with a device at a second site, the television communication terminal comprising:
    an imaging device;
    a mode selector that switches a mode between a conference mode and a material sharing mode;
    a receiver that receives a video image from a device at the second site;
    a material data inputter through which material data used in the material sharing mode is input;
    a projector that is positioned at the first site and is spaced from a projection screen;
    a detector that detects a pointing object; and
    a transmitter,
    wherein, in the material sharing mode,
        the projector projects the material data input through the material data inputter onto the projection screen;
        the imaging device takes an image of an area including the projection screen;
        the detector detects the pointing object that is located in the space between the projection screen and the imaging device, from a modified image generated by modifying the image of the area including the projection screen taken by the imaging device; and
        the transmitter transmits the material data input through the material data inputter and a detection result of the detector, to the device at the second site, but does not transmit the image of the area including the projection screen taken by the imaging device;
    wherein, in the conference mode,
        the projector projects the video image received from the device at the second site through the receiver onto the projection screen;
        the imaging device takes a video image of at least one participant in the video conference; and
        the transmitter transmits the video image taken by the imaging device to the device at the second site, but does not transmit the detection result of the detector,
    wherein the detector generates the modified image by clipping a part of the image of the area including the projection screen taken by the imaging device.

2. The television communication terminal according to claim 1, wherein
    the detector compares the modified image generated by modifying the image of the area including the projection screen taken by the imaging device with the material data input through the material data inputter, to detect the pointing object located in the space between the projection screen and the imaging device.

3. The television communication terminal according to claim 2, wherein
    the detector obtains location information of the pointing object with respect to the projection screen, and
    the transmitter transmits the location information of the pointing object detected by the detector.

4. The television communication terminal according to claim 2, wherein
the detector obtains location information of the pointing object with respect to the projection screen, and
the transmitter combines the material data with a graphic symbol at a location corresponding to the location information detected by the detector and transmits the combined material data and graphic symbol.

5. The television communication terminal according to claim 2, wherein
the transmitter combines the material data with an object image extracted from the modified image generated by modifying the image of the area including the projection screen taken by the imaging device, the object image including an area corresponding to the pointing object detected by the detector, and transmits the combined material data and object image.

6. The television communication terminal according to claim 2, wherein the detector detects a difference between the modified image generated by modifying the image of the area including the projection screen taken by the imaging device and the material data input through the material data inputter, to detect the pointing object located in the space between the projection screen and the imaging device.

7. The television communication terminal according to claim 1, wherein
the detector detects the pointing object by detecting a shape of the pointing object learned beforehand, from the modified image generated by modifying the image of the area including the projection screen taken by the imaging device.

8. The television communication terminal according to claim 1, wherein
the imaging device is a ranging-enabled stereo camera capable of measuring a distance to a target, and generating ranging data, and
the detector detects the pointing object by using the ranging data obtained by taking the image of the area including the projection screen by the imaging device.

9. A television communication system using the television communication terminal according to claim 1.

10. The television communication terminal according to claim 1, wherein, the projector and the imaging device are integrated in the television communication terminal, and the projection screen is provided separately from the television communication terminal.

11. The television communication terminal according to claim 1, wherein the detector extracts the pointing object from the modified image generated by modifying the image of the area including the projection screen taken by the imaging device.

12. The television communication terminal according to claim 1, further comprising a first memory and a second memory, wherein, in the material sharing mode,
the first memory stores one frame of the material data projected on the screen, from the material data input through the material data inputter,
the second memory stores the image of the area including the projection screen taken by the imaging device, when the one frame of the material data stored in the first memory is projected on the projection screen, and
the detector compares the one frame of the material data stored in the first memory and the modified image generated by modifying the image of the area including the projection screen stored in the second memory.

13. The television communication terminal according to claim 1, wherein the detector generates the modified image by changing an orientation of the image of the area including the projection screen taken by the imaging device.

14. The television communication terminal according to claim 1, wherein the detector clips the part of the image having a brightness more than a predetermined value.

15. The television communication terminal according to claim 1, wherein the detector generates the modified image by correcting a distortion of the image of the area including the projection screen taken by the imaging device.

16. The television communication terminal according to claim 1, wherein the mode selector switches the mode between the conference mode, in which the imaging device is directed toward the at least one participant in the video conference, and the material sharing mode, in which the imaging device is directed to the projection screen.

* * * * *